(12) United States Patent
Schlipper et al.

(10) Patent No.: US 12,018,491 B2
(45) Date of Patent: Jun. 25, 2024

(54) FASTENER ASSEMBLY, MESH PANEL AND BARRIER SYSTEM

(71) Applicant: MRM HK Limited, Hong Kong (CN)

(72) Inventors: Robert Wesley Schlipper, Hong Kong (CN); Andrea Ragazzo, Hong Kong (CN)

(73) Assignee: MRM HK Limited, Hong Kong (CN)

(*) Notice: Subject to any disclaimer, the term of this patent is extended or adjusted under 35 U.S.C. 154(b) by 1185 days.

(21) Appl. No.: 16/463,521

(22) PCT Filed: Nov. 23, 2017

(86) PCT No.: PCT/CN2017/112643
§ 371 (c)(1),
(2) Date: May 23, 2019

(87) PCT Pub. No.: WO2018/095371
PCT Pub. Date: May 31, 2018

(65) Prior Publication Data
US 2019/0284815 A1    Sep. 19, 2019

(30) Foreign Application Priority Data

Nov. 23, 2016   (AU) ................................ 2016904803

(51) Int. Cl.
*E04H 17/16*       (2006.01)
*E04F 11/18*       (2006.01)
(Continued)

(52) U.S. Cl.
CPC ...... *E04F 11/1817* (2013.01); *E04F 11/1855* (2013.01); *E04G 21/30* (2013.01);
(Continued)

(58) Field of Classification Search
CPC ....... F16B 2/08; E04F 11/855; E04F 11/1857; E04F 11/1855; E04H 17/16; E04H 17/161; E04H 17/17; E04G 21/32; E01F 7/02
See application file for complete search history.

(56) References Cited

U.S. PATENT DOCUMENTS 4,899,963 A    2/1990  Murphy
4,901,403 A    2/1990  Larsen
(Continued)

FOREIGN PATENT DOCUMENTS

CN    101952162 A    1/2011
CN    203050143 U    7/2013
(Continued)

OTHER PUBLICATIONS

International Search Report of PCT/CN2017/112643, mailed Feb. 26, 2018.
(Continued)

*Primary Examiner* — Michael P Ferguson
(74) *Attorney, Agent, or Firm* — Renner, Kenner, Greive, Bobak, Taylor & Weber

(57) ABSTRACT

A fastener assembly for mounting a panel to a framework includes an elongate flexible tie having a proximal end and an opposing distal end and a clamping block. The clamping block has a tie-receiving channel extending between an inner and an opposing outer side, and a gripper in or adjacent the tie-receiving channel for gripping the tie. The proximal end is fixable to the clamping block and, in use, the inner side of the clamping block abuts the panel and the gripper grips the tie such that tension in the tie presses the inner side of the clamping block against the panel. A mesh panel made of polymeric material and having a honeycomb shaped mesh, together with the fastener assembly, forms a barrier (Continued)

system for erecting a drop-protection barrier on a safety railing, scaffolding, or like framework.

30 Claims, 15 Drawing Sheets

(51) Int. Cl.
    *E04G 21/30*     (2006.01)
    *E04G 21/32*     (2006.01)
    *E04H 17/18*     (2006.01)
    *F16B 2/08*     (2006.01)
    *F16B 5/06*     (2006.01)
    *F16B 5/12*     (2006.01)

(52) U.S. Cl.
    CPC ......... *E04G 21/32* (2013.01); *E04H 17/1602* (2021.01); *E04H 17/161* (2013.01); *E04H 17/165* (2013.01); *E04H 17/17* (2021.01); *E04H 17/18* (2013.01); *F16B 2/08* (2013.01); *F16B 5/0685* (2013.01); *F16B 5/12* (2013.01); *E04F 2011/1823* (2013.01)

(56) References Cited

U.S. PATENT DOCUMENTS

| | | | |
|---|---|---|---|
| 5,387,250 A | 2/1995 | Sølbeck | |
| 5,653,409 A | 8/1997 | White, Jr. et al. | |
| 5,702,081 A * | 12/1997 | Gallemore, II | G09F 7/18 |
| | | | 248/219.4 |
| 5,785,616 A | 7/1998 | Dodge | |
| 8,636,266 B2 * | 1/2014 | Gill | E04F 11/1855 |
| | | | 256/DIG. 6 |
| 8,870,138 B2 | 10/2014 | Maguire | |
| 9,452,799 B2 | 9/2016 | Maguire | |
| 2014/0318891 A1 | 10/2014 | Crothers et al. | |
| 2015/0026935 A1 | 1/2015 | Prescott | |
| 2015/0225971 A1 | 8/2015 | Gill | |
| 2017/0058558 A1 * | 3/2017 | Calle | E04H 17/06 |

FOREIGN PATENT DOCUMENTS

| | | | | |
|---|---|---|---|---|
| CN | 203237579 U | | 10/2013 | |
| CN | 204642610 U | | 9/2015 | |
| DE | 43 04 239 | * | 8/1994 | ............... F16B 2/08 |
| DE | 101 53 810 | * | 3/2003 | ............ E04H 17/24 |
| EP | 0522033 B1 | | 10/1993 | |
| EP | 0 606 852 | * | 7/1994 | ............... B60R 9/04 |
| EP | 1219839 A1 | | 7/2002 | |
| JP | S62-82407 U | | 5/1987 | |
| JP | H06-50004 A | | 2/1994 | |
| JP | H09-53757 A | | 2/1997 | |
| JP | 2000179158 A | | 6/2000 | |
| JP | 2002068278 A | | 3/2002 | |
| JP | 2009012799 A | | 1/2009 | |
| JP | 2012102520 A | | 5/2012 | |
| JP | 2013085396 A | | 5/2013 | |
| JP | 2015212575 A | | 11/2015 | |
| WO | WO 2012/023035 | * | 2/2012 | ............ E04H 17/16 |
| WO | WO 2013054490 A1 | | 4/2013 | |

OTHER PUBLICATIONS

Japanese Patent Office: Notice of Reasons for Refusal dated Aug. 23, 2021, Japanese Patent Application No. 2019-547754.

* cited by examiner

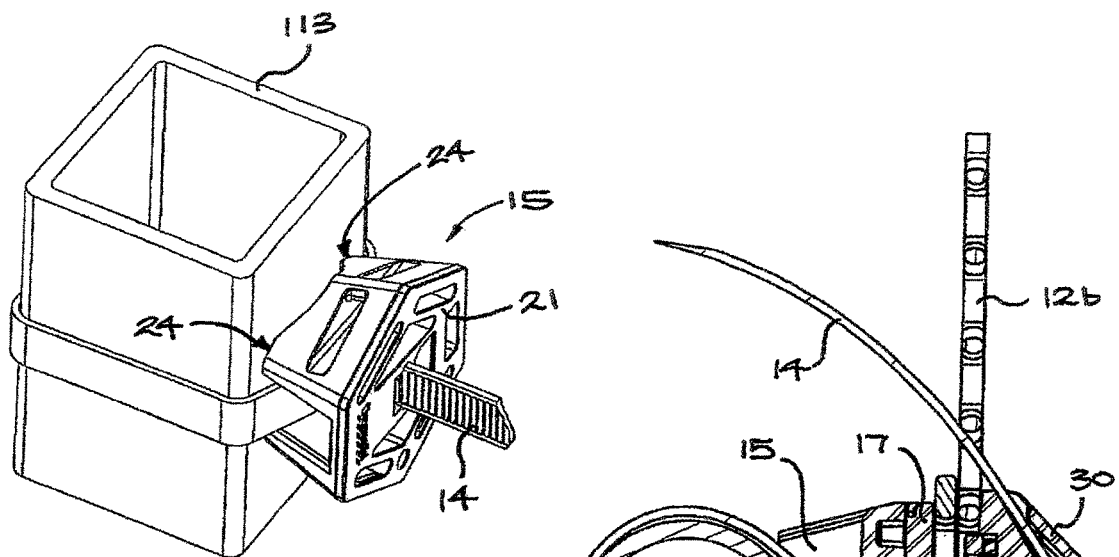
FIG. 3
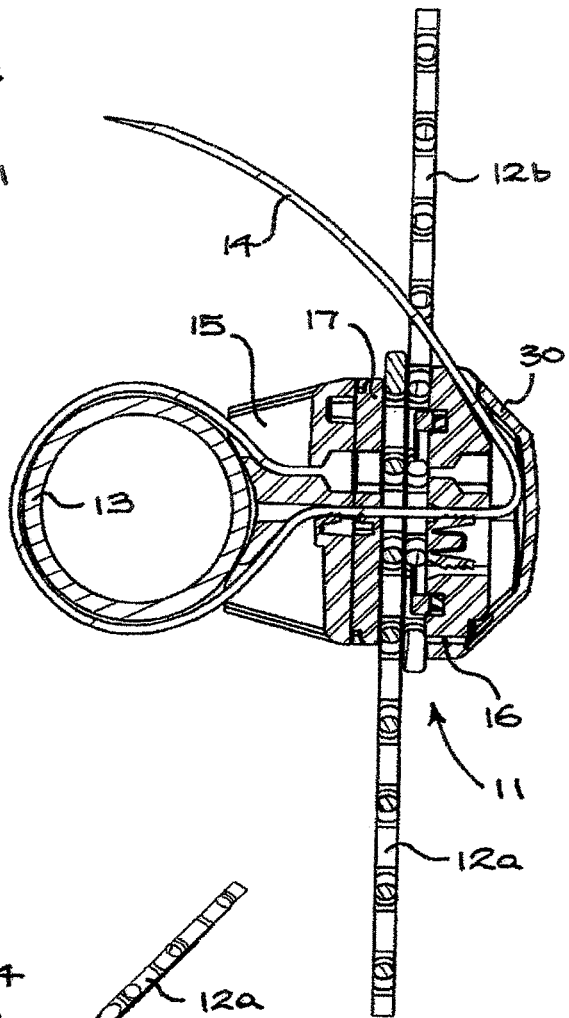
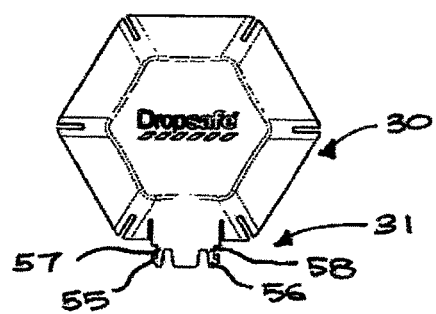
FIG. 4
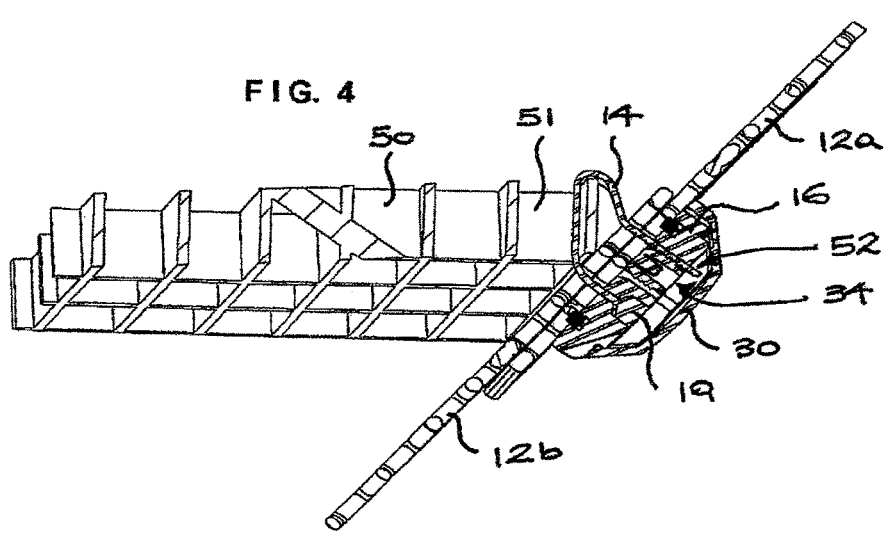
FIG. 5
FIG. 6

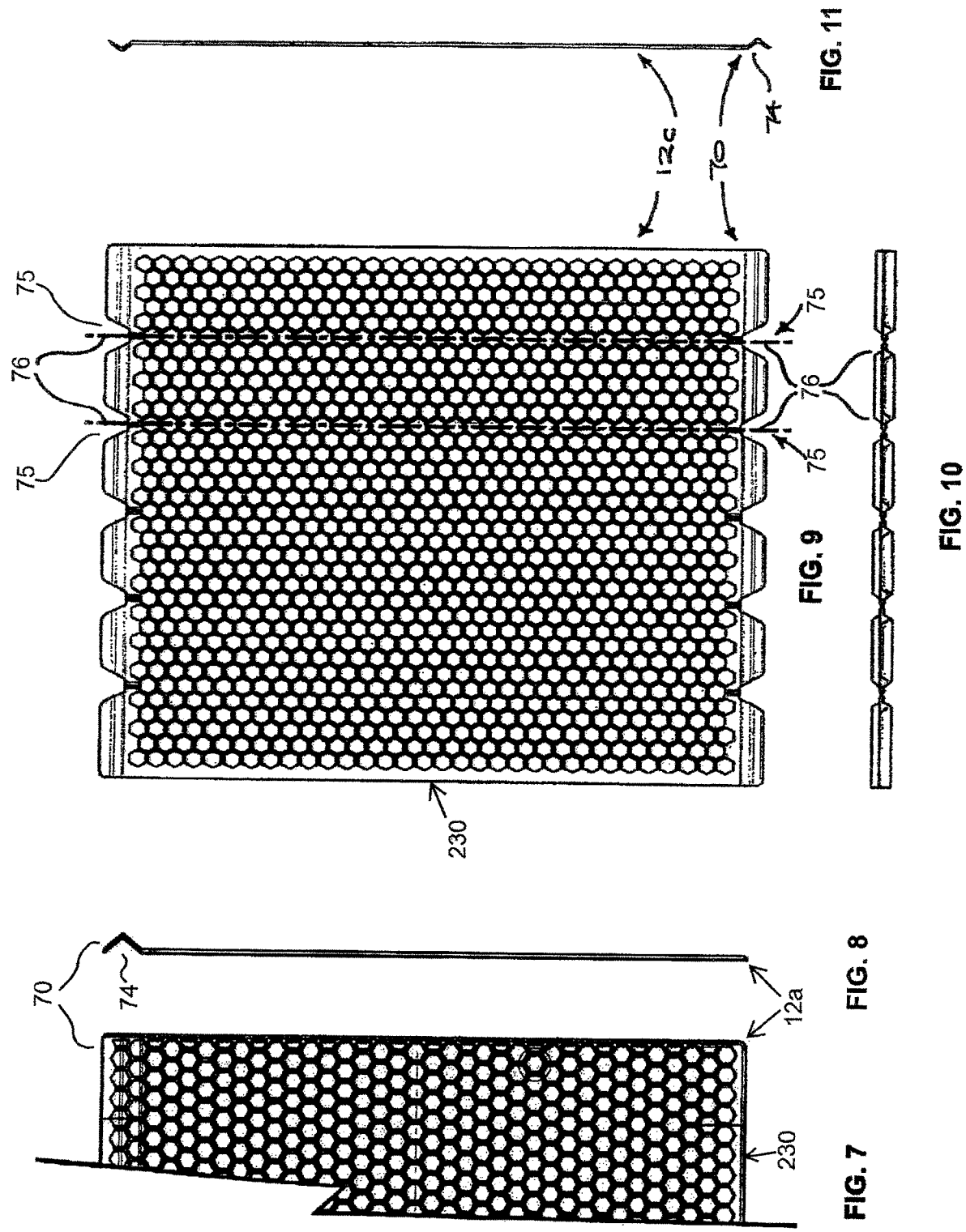

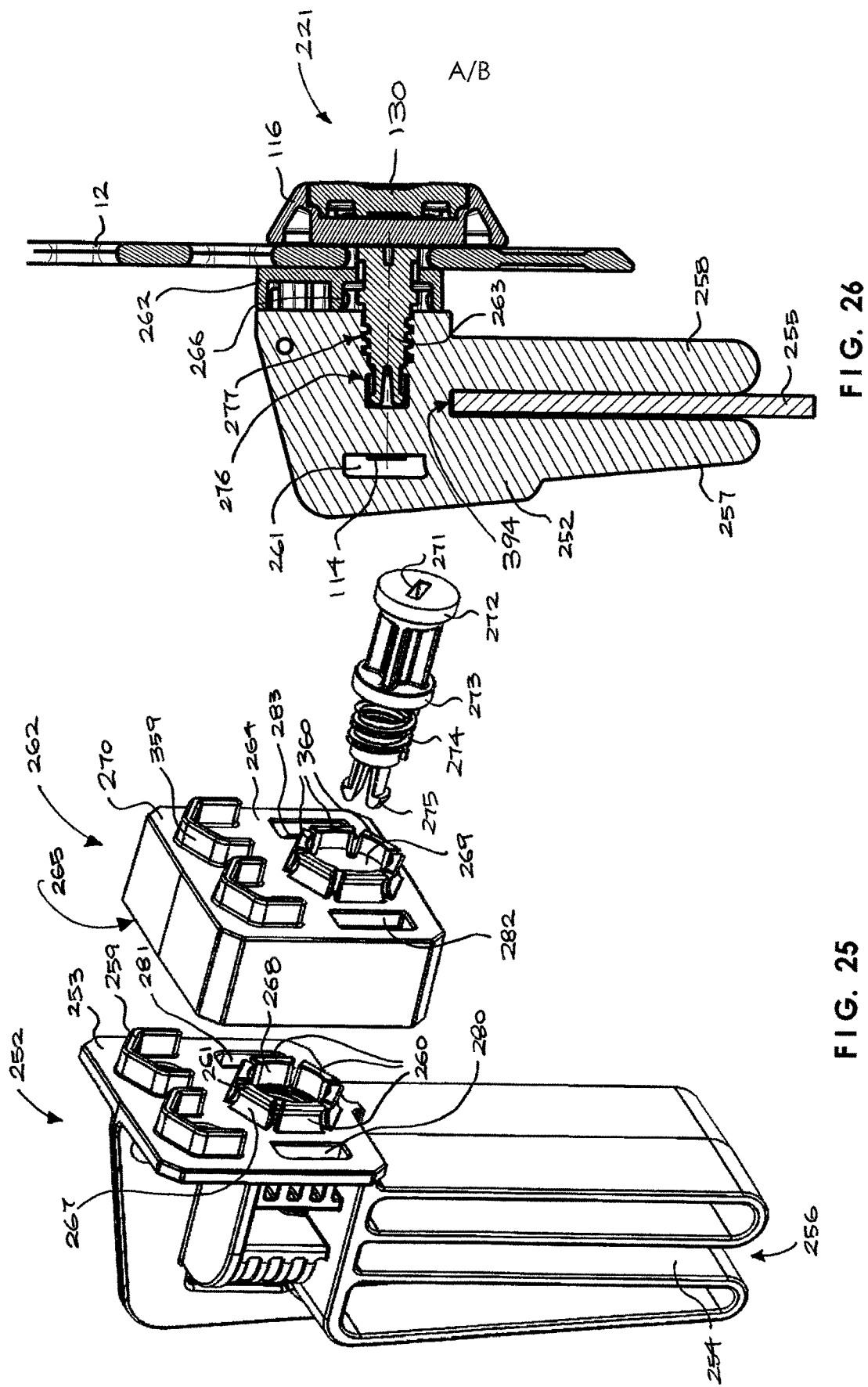

FASTENER ASSEMBLY, MESH PANEL AND BARRIER SYSTEM

TECHNICAL FIELD

The present invention relates to a fastener assembly and mesh panel of a safety barrier system for restraining objects from falling from elevated walkways, platforms, stairways, scaffolding and the like.

BACKGROUND OF THE INVENTION

When working in elevated positions, in order to protect anyone below, safety barriers should be provided to restrain falling objects. An upright safety barrier may be provided around the perimeter of the elevated area, fixed to a guard railing framework or scaffold. Since a drop danger exists while the safety barrier itself is being installed, it is important that the barrier system is designed to mitigate the associated risks. For instance, the system should ideally be readily installed by a single worker with a minimum number of tools, it should have a high strength-to-weight ratio and a small number of component parts. Prior art solutions have not addressed these needs in an optimum manner, and there is therefore a need for an improved safety barrier system which addresses these needs, and which is relatively inexpensive to manufacture and is sufficiently versatile that it can be adapted to provide a continuous barrier in a wide variety of different installations. It is an object of the present invention to address this need or, more generally, to provide an improved safety barrier system.

DISCLOSURE OF THE INVENTION

According to one aspect of the present invention there is provided a fastener assembly for mounting a panel to a framework, the fastener assembly comprising:
- an elongate flexible tie having a proximal end and an opposing distal end; and
- a clamping block having a tie-receiving channel extending between an inner side and an opposing outer side of the clamping block, the clamping block having gripping means in or adjacent the tie-receiving channel for gripping the tie, wherein the proximal end is fixable to the clamping block and, in use, the inner side of the clamping block abuts the panel and the gripping means grips the tie such that tension in the tie presses the inner side of the clamping block against the panel.

Preferably the fastener assembly further comprises a saddle having a tie-receiving channel, a concave inner face for abutting a member of the framework and an opposing outer face wherein, in use, the outer face of the saddle and the inner side of the clamping block abut opposing surfaces of the panel and tension in the tie clamps the panel between the saddle and the clamping block.

Preferably a female coupling is recessed in the outer face of the saddle and the fastener assembly further comprises at least one spacer having opposing inner and outer surfaces substantially parallel to one another, each spacer having a male coupling projecting from the inner surface of the spacer that is complementary to the female coupling on the saddle and a female coupling recessed in the outer surface of the spacer that is of like form to the female coupling of the saddle.

Preferably the spacer further comprises a tie-receiving channel extending between an inner side and an opposing outer side of the spacer for receiving the tie.

Preferably the fastener assembly further comprises a hinged piece connected by a hinge to the clamping block for pivoting between a closed position in which the hinged piece has an inner surface that substantially overlies the outer side of the clamping block and an open position.

Preferably the tie comprises a head formed on the proximal end and received in a through-extending aperture in the clamping block, the aperture having a stepped form comprising a mouth part proximate the outer face for receiving the head and an adjacent throat part through which head cannot pass.

Preferably the tie comprises a strap. Alternatively, the tie may comprise another flexible elongate tension member, such as a wire, cord or chain.

Preferably the saddle comprises resilient material, and opposing arms integral with the saddle that project inwardly from the inner side for clipping the saddle to the framework.

Preferably the saddle comprises a base part on which the concave inner face and outer face are formed and from opposite edges of which the arms extend and wherein a concavity in the base at an inner end of each arm is arcuate and bounds a hinge portion connecting each arm to the base.

Preferably each arm comprises an inner concave face that intersects with a tapered face at a neck, the tapered faces diverging a longitudinal direction of each arm from the neck toward a respective end of the arm.

Preferably each arm further comprises a pair of substantially parallel ribs elongated in the longitudinal direction of the arm, and disposed either side of a channel for receiving the tie.

Preferably the hinge comprises a cylindrical external surface received in a complementary pivot-receiving recess in one of the hinged piece and the clamping block, wherein the one of the hinged piece and the clamping block is formed of a resilient material, such that the hinged piece is connected to the clamping block by a snap fit.

Preferably a slot in the hinged piece is aligned with the tie-receiving channel in the open position and has a form complementary to the cross-section of the strap.

Preferably the slot extends next to an inner side of the hinged piece.

Preferably the clamping block further comprises a second tie-receiving channel, wherein the second tie-receiving channel and first tie-receiving channel are proximate opposite sides of the hinge, whereby the distal end can be passed outwardly through the first tie-receiving channel, around the hinged piece, and in through the second tie-receiving channel.

Preferably the head is formed by doubling over the strap upon itself, the head received in a stepped recess in a reinforcement, the reinforcement received in the stepped aperture in the clamping block.

Preferably on an end of the hinged piece opposite the hinge, latching lugs are formed for engaging a complementary recess on the clamping block for latching the hinged piece in the closed position.

Preferably the clamping block comprises a recess, and in the closed position the hinged piece is received within the recess.

Preferably, with the hinged piece attached to the clamping block in the closed position, the hinged piece lies at or with any profile view of the clamping block in a plane perpendicular to the inner side.

Preferably in said any profile the clamping block tapers to narrow toward its outer edges.

Preferably the cylindrical surface is on the hinged piece and the pivot-receiving recess is on the clamping block, the pivot-receiving recess is formed by a tab that projects generally outwardly from the outer side of the clamping block, and a through-extending tab-receiving opening in the hinged piece receives the tab in the closed position.

Preferably the strap is aligned such that a major dimension of the cross-section of the strap is aligned parallel to an axis of the hinge.

Preferably a channel in the outer face of the hinged member is formed for receiving the strap.

In one embodiment the tie comprises ratchet serrations disposed in a longitudinal array on a side of the strap;

the saddle is fixed to the proximal end, the saddle further comprises at least one saddle tooth integral with the saddle and disposed in the tie-receiving channel such that passing the strap through the tie-receiving channel engages the saddle tooth with the serrations on the strap forms a loop adjacent the inner face for passing around a member of the framework and the distal end of the strap projects from the outer face, and the clamping block having a clamping block tooth integral with the clamping block and disposed in the tie-receiving channel opening, such that passing the strap through the tie-receiving channel opening engages the clamping block tooth with the serrations on the strap.

In another aspect the invention comprises a mesh panel made of polymeric material and having a honeycomb shaped mesh.

Preferably webs of the honeycomb shaped mesh have a generally elliptical cross-section, with a long axis of the elliptical cross-section aligned transversely to the mesh panel.

Preferably the mesh panel further comprises a perimeter frame that surrounds the honeycomb shaped mesh and is integral therewith, the perimeter frame being continuous and imperforate.

Preferably a rectangular form with an integral stiffener extending continuously along at least one of the long edges of the panel.

Preferably the stiffener is of constant form throughout its length and defines a channel.

Preferably the integral stiffener comprises integral stiffeners extending continuously along two opposite edges of the panel, notches in the two opposite edges are disposed a regular rectangular array, the notches being aligned so as to define parallel hinge axes between notches on opposing ones of the opposite edges, such that the panel may bend along the parallel hinge axes.

Preferably a corner panel assembly of a plurality of first rectangular panels each with continuous hinges along both long edges, each of the first rectangular panels connected to an adjacent one of the first rectangular panels by one of the continuous hinges.

Preferably corner panel assembly further comprises two second rectangular panels, each with a continuous hinge along one edge, wherein opposing outermost ones of the first rectangular panels are each connected to one of the two second rectangular panels by a respective continuous hinge.

Preferably a hinge pin joins each adjacent rectangular panel, and each hinge pin is sheathed in compliant material.

In yet a further aspect the invention provides a barrier system comprising: a fastener assembly substantially as described above and a mesh panel substantially as described above.

Preferably the barrier system comprises a bracket for supporting a lower panel edge in abutment with an adjacent structural member, the bracket having a face for engaging a complementary surface of the panel; recesses in the bracket for receiving the strap disposed in opposing sides of the face, and a support surface substantially perpendicular to the face, through which the weight supported by the bracket is transferred.

Optionally the bracket may comprises projecting flexible tabs providing a snap fit engagement with openings in the mesh panel and a spacer block with opposing outer and inner sides replicating cooperating attachment features of the bracket and mesh panel respectively for permitting a snap fit engagement between the bracket and the inner side of spacer block and between outer side of the spacer block and the openings in the mesh panel, and a screw fastener for blocking inward deflection of the tabs sufficient to permit disengagement of the connected bracket, spacer block and mesh panel.

This invention provides a fastener assembly, mesh panel barrier system which is effective and efficient in operational use, which may be economically constructed and which can readily accommodate a wide variety of different installations. Due to its light weight and small number of components, it can be readily installed by a single user without hand tools.

BRIEF DESCRIPTION OF THE DRAWINGS

Preferred forms of the present invention will now be described by way of example with reference to the accompanying drawings, wherein:

FIG. 3 is a perspective view of a framework member showing the fixing of the saddle of the fastener assembly of FIG. 1;

FIG. 4 is a front view of a hinged cover of the fastener assembly of FIG. 1;

FIG. 5 is a section in a horizontal plane through the assembled fastener assembly of FIG. 1;

FIG. 6 is a section through an alternative assembly of the strap and clamping block of the fastener assembly of FIG. 1;

FIGS. 7 and 8 are front and side views, respectively, of a main panel of the barrier of the invention;

FIGS. 9, 10, and 11 are front, top and side views, respectively, of a first embodiment of a corner panel of the barrier of the invention;

FIG. 25 is a perspective view of a bracket assembly of the barrier system of the invention;

FIG. 26 is a partial section in an upright plane through the bracket assembly of FIG. 25 in use, connecting a panel and toe rail;

DESCRIPTION OF THE PREFERRED EMBODIMENTS

Figures 1, 2:
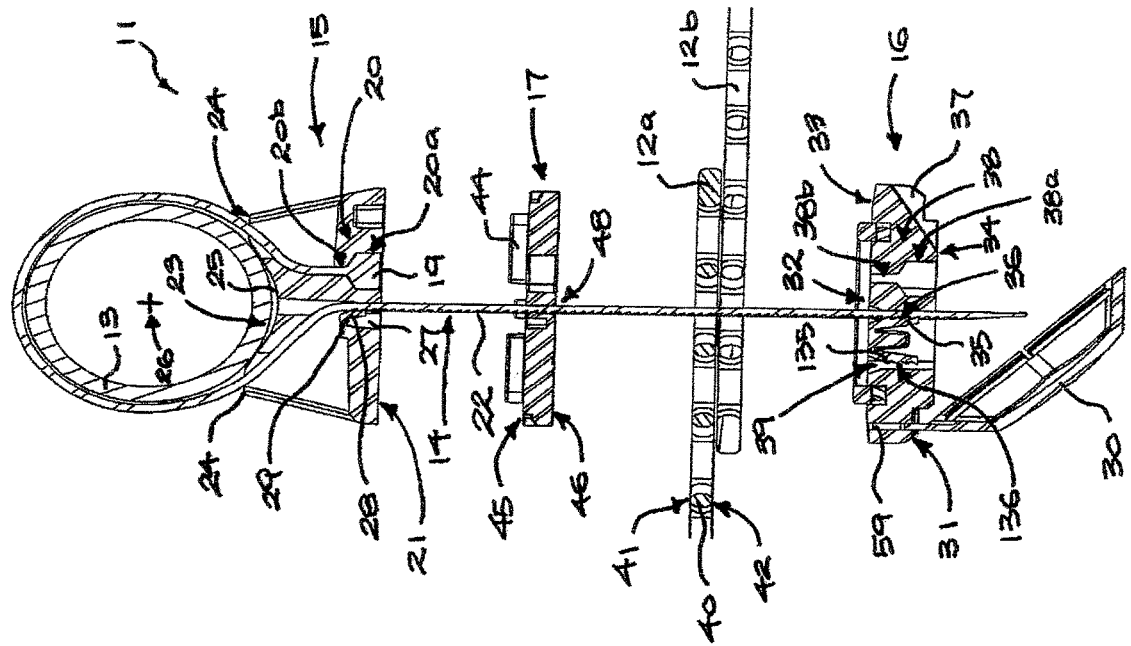
FIG. 1 is an exploded perspective view of a fastener assembly of a first embodiment of the invention.
FIG. 2 is a section in a horizontal plane through the fastener assembly of FIG. 1.

Referring to FIGS. 1 and 2, a first embodiment of a fastener assembly 11 for mounting panels 12 (such as the illustrated panels 12a, 12b) to framework members 13, such as posts and rails, may generally comprise an elongate flexible tie in the form of a strap 14, a saddle 15 and clamping block 16 for engaging the strap 14.

Figure 13:
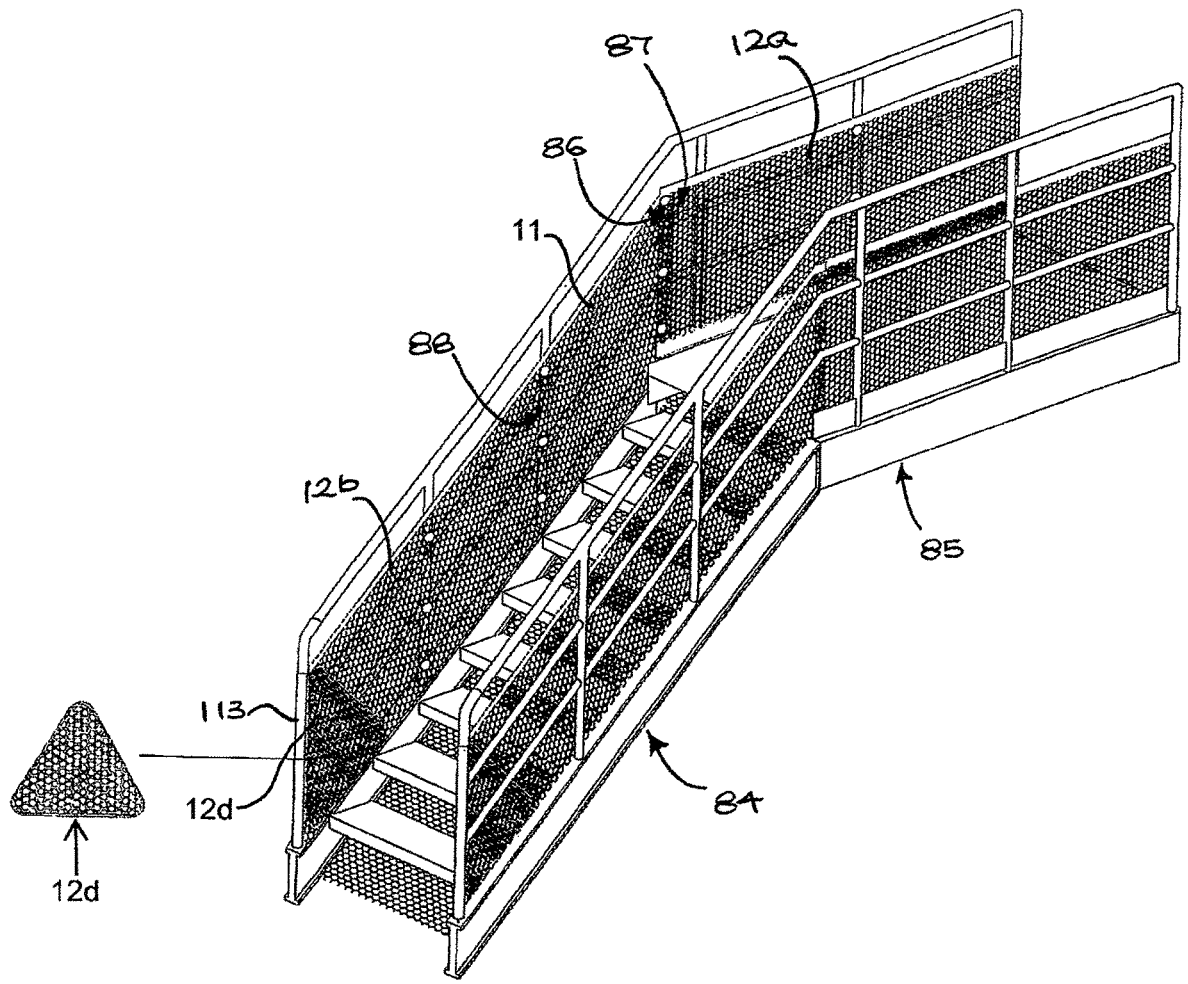
FIG. 13 is a perspective view of a stair transition comprising triangular panels of the barrier of the invention.

The fastener assembly 11 provides for the attachment of the panels 12a, 12b to a generally upright post and rail framework, as of a guard rail (e.g. see FIGS. 13 and 14) or scaffold, for drop protection. Common variations in the construction of such frameworks should be accommodated by the invention in such a way that the panels 12a, 12b are, like the frameworks, generally upright. One framework variation, for instance, is in the manner that the rails are connected to the posts, where either short rail lengths can span between posts that interrupt a plane of the rail lengths, or else long rails can be fixed alongside the posts. Variations in the horizontal distance between the generally upright plane of the panel and a support surface provided by the posts, or rails, thus needs to be accommodated. The saddle 15 serves either alone, or in combination with one spacer 17, or with a plurality of stacked spacers 17 (not shown), to provide a planar outer face selectively positioned relative to the member 13 to abut a panel 12a, 12b opposite the clamping block 16.

Advantageously, complementary coupling means are provided on the saddle 15 and each spacer 17. A female coupling 47 is recessed in the outer face 21 of the saddle 15. The spacers 17 each have opposing inner and outer surfaces 45, 46 substantially parallel to one another, and a male coupling 44 projecting from the inner surface of the spacer 17 that is complementary to the female coupling 47 on the saddle 15 and a female coupling 43 recessed in the outer surface 46 that is of like form to the female coupling 47. The cooperating female and male couplings 43, 44 and 47 may comprise a snap fit. These couplings 43, 44 and 47 allow multiple spacers to joined together if required, and also connected to the saddle 15, forming a single assembly. The spacer 17 further comprises a strap-receiving channel 48 extending between the inner surface 45 and an opposing outer surface 46.

The strap 14 may have an integral head 19 formed on the proximal end and received in the saddle 15 in a through-extending aperture 20 having a stepped form comprising a complementary mouth part 20a that is proximate an outer face 21. The head 19 cannot pass through an adjacent throat part 20b when tension is applied to the strap 14, thus securing the strap 14 to the saddle 15. Inclined ratchet serrations 22 may be disposed in a continuous longitudinal array on a side of the strap 14.

The saddle 15 may be formed in one-piece, as by moulding from polymeric material. It has the outer face 21 for abutting the panel or, as shown, a spacer 17 for abutting the panel. Opposite the outer face 21, an inner face 23 of the saddle 15 abuts the post member 13. The inner face 23 may comprise coplanar surfaces 24, disposed generally parallel to the outer face 21 for abutting a framework member with a planar surface, as shown in FIG. 3. Between the coplanar surfaces 24 a concave surface 25 may be provided with an axis 26 parallel to the outer face 21. The concave surface may be cylindrical, or a like axially aligned surface in which every point on the concave surface 25 generally lies on a line parallel to the axis 26. In this manner, depending upon whether the inner face 23 abuts a convex or flat surface of a framework member, when clamped thereto by the strap, the outer face 21 is approximately parallel to the longitudinal axis of the framework member. The saddle 15 further includes a strap-receiving channel 27 therethrough, generally between the inner face 23 and the outer face 21. The strap-receiving channel 27 may have a slotted form, elongated parallel to the axis 26, since the strap is aligned a major dimension of the cross-section of the strap is aligned parallel to axis 26. A saddle tooth 28 may be integral with the saddle 15 and disposed in the strap-receiving channel 27. The saddle tooth 28 is connected by a living hinge 29 by which, after passing the strap through the strap-receiving channel 27, the saddle tooth 28 is resiliently urged to engage the serrations 22 and prevent the strap 14 being drawn over the tooth 28 in the opposite direction. Any tension applied to the strap 14 in this opposite direction serves to draw the tooth to more firmly grip the strap. In this position, the distal end of the strap 14 extends through the aperture 27 and projects from the outer face 21, while the proximal section of the strap 14 forms a loop adjacent the inner face 23 about the framework member 13.

The clamping block 16 is also preferably formed in one-piece from polymeric material. The clamping block 16 may have a centrally located strap-receiving channel 32 extending between an inner side 33 and an opposing outer side 34. A tab 35 integral with the clamping block 16 may have an array of clamping block teeth 36 complementary to the serrations 22 and disposed in the strap-receiving channel 32. Passing the strap 14 through the strap-receiving channel 32 engages the securing teeth 36 with the serrations 22. The tab 35 provides a cantilever-type resilient mounting for the teeth, and flexure of tab 35 allows enough deflection for the teeth 36 to ride over the serrations 22, when the strap 14 is pulled away from the outer side 34, while preventing reverse movement. A recess 37 may be formed in the periphery of the outer side 34 for receiving the strap 14.

A hinged piece 30 may be connected to the clamping block by a hinge 31. The hinged piece 30 is shown open in FIGS. 1 and 2, and closed in FIGS. 5 and 6. The hinge 31 may be formed by two opposing nubs 55, 56 aligned coaxially to define a hinge axis, and formed on the tips of respective protruding tongues 57, 58. The hinged piece 30 is thus fixed to the clamping block 16 by resilient deflection of the tongues 57, 58 when they are pushed past a shoulder into a slot 59 located near an edge of the outer side 34 of the clamping block 16.

The panels 12 are of mesh construction, including an array of like openings suitable for receiving the strap 14. The mesh may have a honeycomb pattern—of nested hexagonal openings—for structural efficiency. As shown in FIG. 2, in cross-section transverse to the principal plane of the mesh, the webs 40 are all of like elliptical form, with the long axis of the ellipse aligned transversely, between the outer faces 41, 42 for reduced aerodynamic drag. These mesh panels are described further below, with reference to FIGS. 7-13.

In use, the saddle 15 may be first fixed to the framework, as by forming the loop about the member 13, 113 and pulling the strap 14 through the strap-receiving channel 27 to protrude from the outer face 21, as shown in FIG. 3. A plurality of the saddles 15 may be fixed, as to posts or rails of the framework, and the result is a set of straps 14 protruding generally parallel to one another, away from their respective saddles 15. A single installer can then readily place a panel, inserting the straps 14 through openings in the mesh, and thus the panel is conveniently temporarily located and supported on the straps 14. At least two of the plurality of saddles 15 and associated protruding straps 14 are horizontally spaced apart and may support the weight of the panel between the two, as near opposite ends of the panel. The major dimension of the cross-section of the strap 14 is preferably aligned vertically, for greater bending stiffness.

Lengthwise ends of adjacent panels 12a, 12b may be overlapped to provide a continuous barrier, as shown in FIG. 1, avoiding any interruptions at these joints. To complete the installation, each strap 14 is fed through the strap-receiving channel 32 in a respective clamping block 16. The strap 14 is tensioned and, in the case of a permanent installation, the distal end protruding from the outer side 34 may be cut off, before the hinged piece 30 is closed, and latched, as by a snap fit. In a temporary installation, the distal end is not cut off, but is instead bent and threaded through an opening in the mesh panel 12a, 12b, as shown in FIG. 5. In this temporary installation, the strap 14 is received in the recess 37 before the hinged piece 30 is closed. If installed in this temporary manner, it is possible to remove the fastening assembly 11 if required, without cutting the strap 14, and so permitting re-use. To do so, the hinged piece 30 is opened and a tool such as a screw driver can be inserted to deflect the tab 35 away from the strap 14, allowing the clamping block 16 to be pulled off the strap 14, before releasing the saddle tooth 28 and saddle 15 in a like manner.

For added versatility, the clamping block 16 may also be used together with the strap 14 to provide a two-component self-mating fastening device for assembling other components of the barrier system. This is achieved by providing two additional apertures extending between the inner and outer sides of the saddle 15, which may be located either side of the strap-receiving channel 32 and comprise: a head-receiving aperture 38 and a strap-receiving channel 39. While this function could be achieved by adding the head-receiving aperture 38 alone, providing an additional strap-receiving channel 39 allows the size of the clamping block 16 to be reduced. The head-receiving aperture 38 has a mouth part 38a proximate the outer side 34 for receiving the head 19 and an adjacent throat part 38b adjacent the inner side 33 and through which head 19 cannot pass. A tab 135 integral with the clamping block 16 has an array of clamping block teeth 136 complementary to the serrations 22 and disposed in the strap-receiving channel 39. Passing the strap 14 through the strap-receiving channel 39 engages the securing teeth 136 with the serrations 22. The tab 135 provides a cantilever-type resilient mounting for the teeth, and flexure of tab 135 allows enough deflection for the teeth 136 to ride over the serrations 22, when the strap 14 is pulled away from the outer side 34.

FIG. 6 shows one application for this fastening device comprising the clamping block 16 together with the strap 14 only, where the framework member has a mounting face aligned obliquely to the pane of the panels. In this application, this fastening device may be used to secure inclined panels below a staircase of a type having open risers. The panels 12a, 12b, 12c, 12d, 12e may be connected to a stair tread 50 formed, for instance, from a grating by passing the loop of the strap 14 through the opening 51. FIG. 6 illustrates the permanent installation, where the distal end 52 of the strap 14 protrudes a small distance from the outer side 34, the distal end having been cut short.

The mesh panels 12 of the barrier system may be formed of moulded polymeric material and come in different shapes, but the main panel 12a is rectangular with an aspect ratio of about 2:1 and is best seen in FIGS. 7 and 8. The planar honeycomb structure of each panel is surrounded by a perimeter frame 230 that is an integral part of the panel and which is continuous and imperforate to provide a smooth, uninterrupted edge that strengthens the panel and avoids snagging. The depth of the perimeter frame 230 (i.e. the distance between the panel edge and the closest adjacent mesh opening) may vary between edges of the panel, and in the rectangular panel 12a the depth along both long edges may exceed the depth along the short edges. This is shown in FIG. 7, where adjacent the long edges are linear arrays of hexagonal openings, while adjacent the short edges are linear arrays of part-hexagonal openings. Extending continuously along a length of the frame 230 on one long edge of the panel 12a is an integral stiffener 70 that may be perforated by the honeycomb openings and of constant form throughout its length, defining a lengthwise channel 74.

Referring to FIGS. 9-12, the mesh panels of the barrier system may further include corner panels 12c that are rectangular and may have an aspect ratio of less than 1:1. Notches 75 formed in edge stiffeners 70 along two opposing edges and in the frame 230 are disposed in a regular, rectangular array. The notches 75 are thus aligned top and bottom with the transverse edges of the panel 12c and locally reduce the bending stiffness of the panel so as to define transverse, parallel hinge axes 76 along which the panel 12c may bend.

Figure 12:
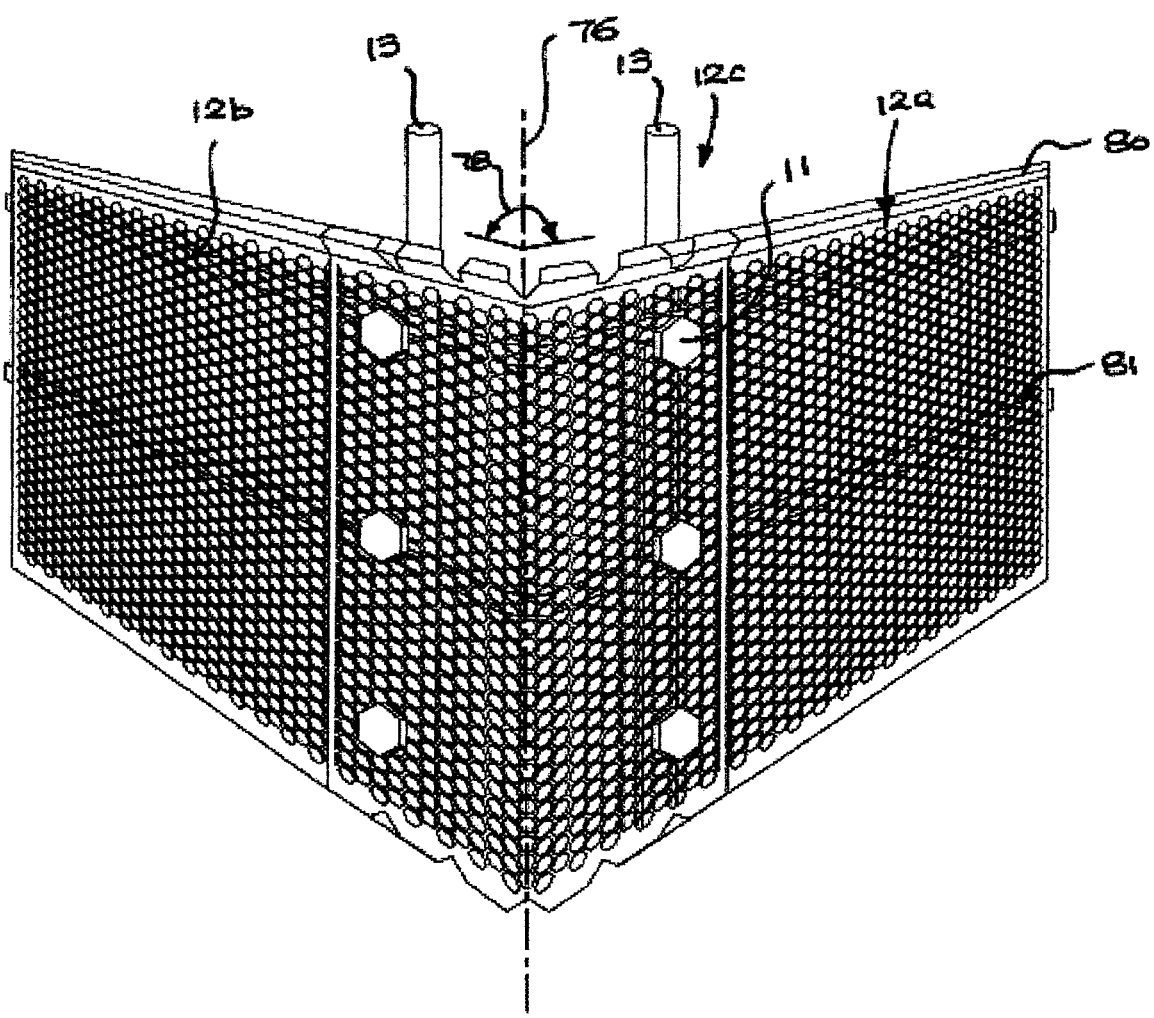
FIG. 12 is a perspective view of the corner panel of FIGS. 9 to 11 in an exemplary installation.

As shown in FIG. 12, the barrier system is mounted to a framework which may comprise upright post members 13 connected to a horizontal hand rail 80, intermediate rail 81 and toe rail 82 and the corner panel 12c accommodates a change of direction of the barrier in a horizontal plane. A dihedral angle 78, which in this example is approximately 90°, exists in a horizontal plane between the panels 12a, 12b which are connected at this corner by a corner panel 12c to provide a continuous barrier. At the sharp corner illustrated, the two upright halves of the panel 12c separated by the upright hinge axis 76 are parallel to, and in abutment with the panels 12a, 12b. The longitudinal ends of the panels 12a, 12b proximate the corner overlap with longitudinal ends of the corner panel 12c, with six fastener assemblies 11 connecting these overlapped sections to the post members 13. Whereas bending along a single hinge axis 76 provides a sharp corner as illustrated and a longitudinally continuous coverage, it will be understood that a radiused corner is formed in a like manner. To accommodate a larger radius at the corner, multiple bends are formed about hinge axes 76 whereby adjacent sections of the panel 12c separated by the hinge axes 76 are inclined to one another.

The barrier system further includes triangular panels 12d used as infill panels where required, such as at the lower end of a stairway 84. From the top, the barrier system shown includes a rectangular panel 12a (alongside the walkway 85) that is upright, with its longitudinal axis horizontal. One upright, transverse edge 86 of panel 12a is disposed at the edge of the stairway 84. To accommodate the change of direction of the barrier in a vertical plane (where the walkway 85 meets the stairway 84) a triangular part (not shown) located at the uppermost longitudinal end of the panel 12*b* is cut out, leaving a cut edge 87 that is aligned generally upright. As in previous embodiments, the panels overlap in the lengthwise direction, and the edge 87 of the panel 12*b* overlaps the transverse edge 86 and the overlapped section is connected by fastener assemblies 11. The rectangular panel 12*b* is mounted with its long axis inclined vertically at the angle of the stairway 84, leaving a triangular gap (not shown) bounded by: the lowermost longitudinal end of the panel 12*b*, the post 113 and the beam supporting the stairway 84. This triangular gap is filled by the triangular panel 12*d*, located with a first edge adjacent to, and parallel to the post 113, a second edge adjacent to, and parallel to the beam supporting the stairway 84 and a third edge overlapping the end of the panel 12*b*. In this manner, the combination of rectangular panels 12*a*, 12*b* and the triangular panels 12*d*, provides a barrier that extends continuously from the end post 113 up the stairway 84 and along the walkway 85.

A second embodiment of the fastener assembly 111 is shown in FIGS. 14 to 20 and, like the first embodiment, generally comprises an elongate flexible tie in the form of a strap 114, a saddle 115, one or more spacers 117 and clamping block 116 for engaging the strap 114 for mounting panels 12*a*, 12*b* to the framework members 13. Like the sub-assembly comprising the clamping block 16, hinged piece 30 and strap 14 of the first embodiment, the clamping block sub-assembly 221 of clamping block 116, hinged piece 130 and strap 114 can be used together in the same fastening applications for fixing the strap in a loop around components to be joined in other applications independent of the saddle 115 and spacers 117.

Referring to FIGS. 14 and 17 to 19, the saddle 115 includes opposing arms 60*a*, 60*b* used to clip the saddle 115 temporarily to the framework member 13. The saddle 115 may be formed in one-piece, as by moulding from resilient material. The outer face 121 and an opposing inner, concave face 125 are formed on a base part 61 of the saddle 115. The two arms 60*a*, 60*b* are of generally like form, largely having reflective symmetry about a plane 167 bisecting the saddle 115. The arms 60*a*, 60*b* project inwardly from opposite edges of the base 61 to bound a space 66 for receiving the member 13. Each arm 60*a*, 60*b* may have a respective concave inner face 62 for abutting the member 13 and an opposing outer face 63. Each concave face 62 may intersect with a tapered face 64 at a neck 65, the tapered faces 64 diverging in a longitudinal direction of each arm 60*a*, 60*b* from the intersection toward a respective end of the arm, to assist in entering the member 13 past the neck 65 into space 66. The concave faces 62 may have respective axes that extend parallel to axis 26 of concave face 125. These faces 62, 125 may have the same radius of curvature, so they are able to simultaneously abut a member 13 that has a cylindrical outer surface of the same radius. However, the arms 60*a*, 60*b* are able to grasp cylindrical outer surface of a range of radii, thereby holding the saddle on the member 13. A concavity 67 in the base 61 at an inner end of each arm 60*a*, 60*b* causes opposing edges 68 of the concave surface 125 to project. An inner end of the concavity 67 is arcuate and bounds a hinge portion 69 connecting each arm to the base 61, and permitting the arms 60*a*, 60*b* to deflect resiliently from the normal, relaxed state (FIG. 19) to a maximum opening when the diameter of member 13 is in the neck 65 (not shown) to a clamped state (FIG. 17) providing sufficient clamping to support the saddle 115 on the member 13.

Figure 18:
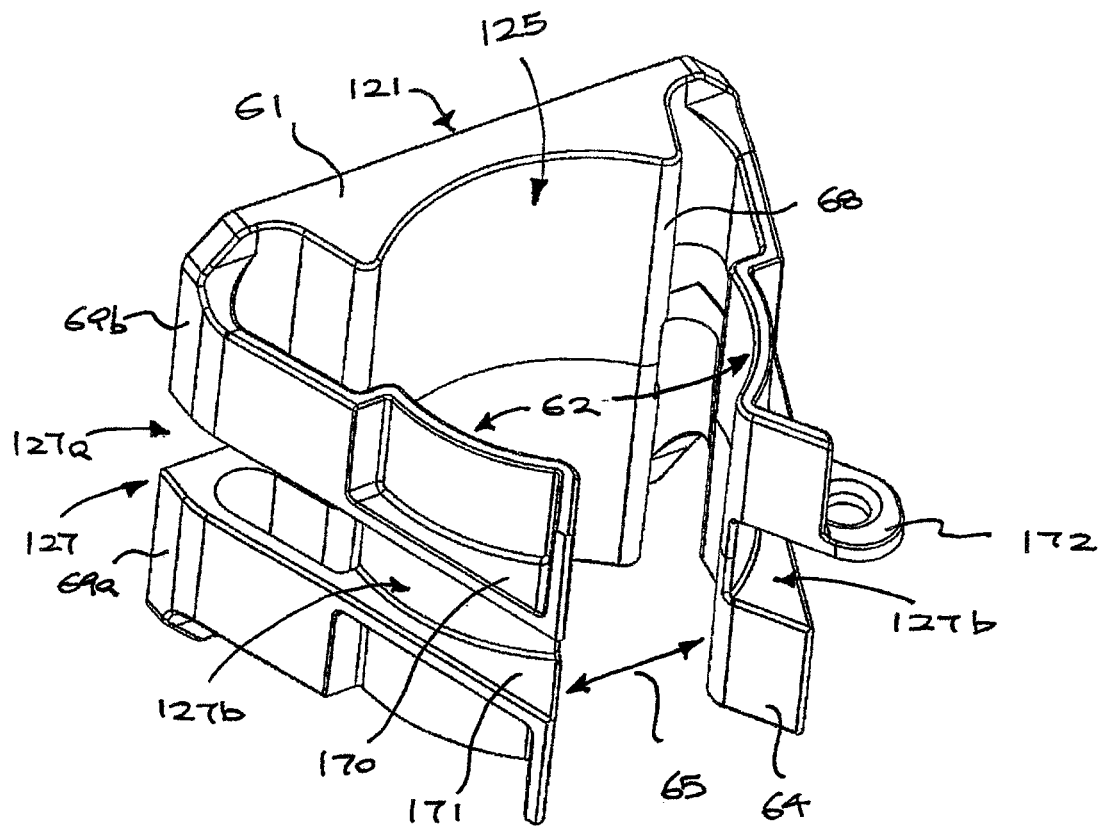
FIG. 18 is a pictorial view of the saddle of the fastener assembly of FIG. 14.
Figure 19:
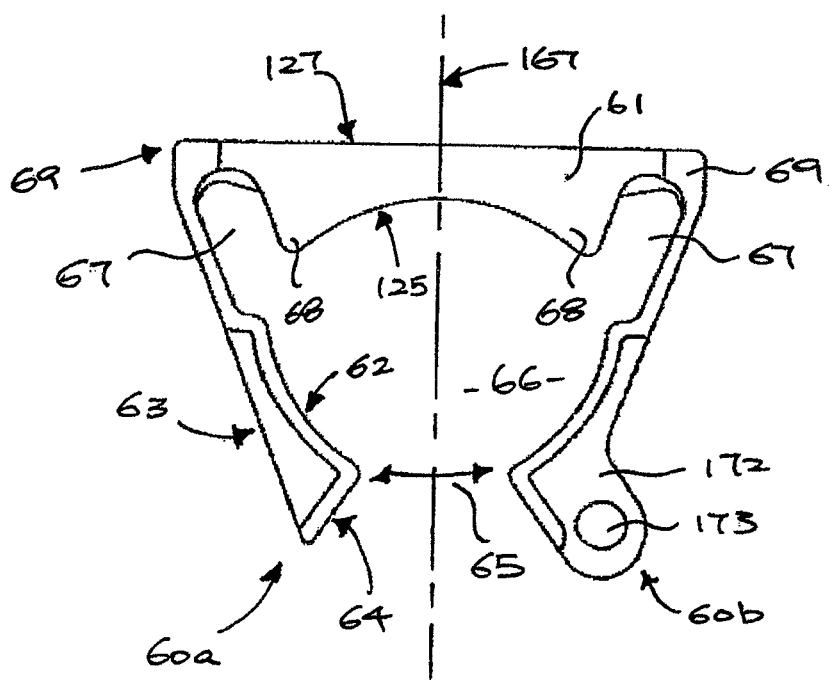
FIG. 19 is an end view of the saddle of the fastener assembly of FIG. 14.

The strap-receiving channel 127 may extend longitudinally through each arm 60*a*, 60*b* forming a notch part 127*a* at the intersection with the base 61 that reduces the stiffness of the hinge portion 69 by forming the hinge portion 69 as two parts 69*a*, 69*b*, as best seen in FIG. 18. Each arm 60*a*, 60*b* further comprises a pair of substantially parallel ribs 170, 171 elongated in the longitudinal direction of the respective arm and located either side of a channel part 127*b* disposed at an outer end of the strap-receiving channel 127 in each arm. An outwardly extending tab 172 may be formed integrally with one of the ribs 170 with an opening 173 for receiving a tether, if required.

Figure 14:
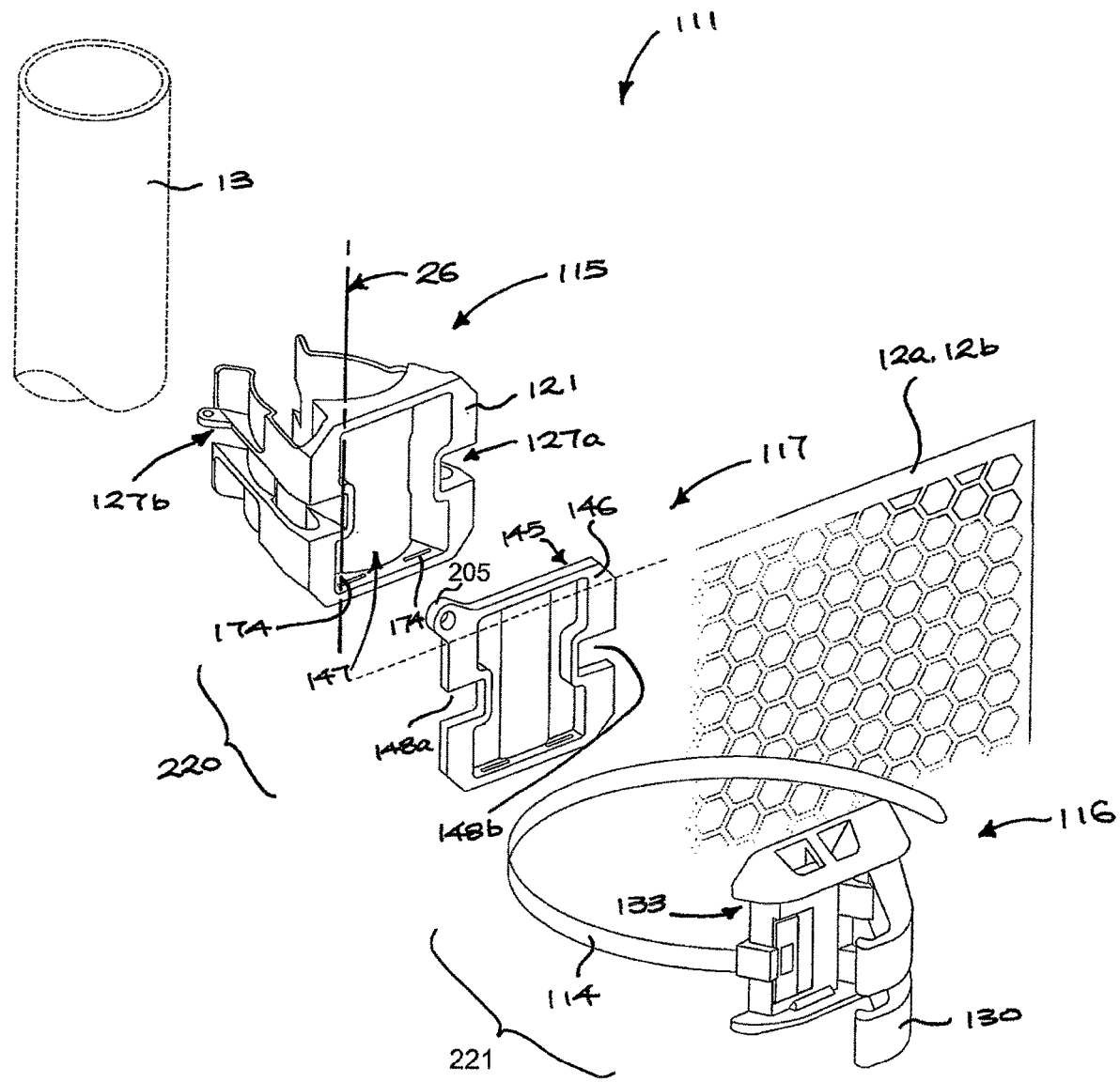
FIG. 14 is an exploded perspective view of a fastener assembly of a second embodiment of the invention.

Referring to FIG. 14, the female coupling 147 on the saddle 115 comprises a shallow recess in the outer face 121, such that the outer face 121 is continuous around the perimeter of the recess. The female coupling 147 may have waisted shape, narrowed in a central part by the opposing notches 127*a*. Grooves 174 in the female coupling 147 may be configured to receive nubs (not shown) in the male coupling 144 to provide the snap fit connecting the spacer 117.

The spacer 117 is shown in FIGS. 14 to 17 and may generally have a rectangular prismatic form with a like waisted shape, narrowed in a central part by the opposing notched strap-receiving channels 148*a*, 148*b* that extend between the inner side 145 and the opposing outer side 146 and are respectively located for registration with the strap-receiving channel 127 in each arm 60*a*, 60*b*. As in the first embodiment, the saddle 115 serves either alone, or in combination with one spacer 117, or with a plurality of stacked spacers 117 (not shown), to provide a planar outer face, selectively positioned relative to the member 13 to abut a panel 12*a*, 12*b* opposite the clamping block 116. The female coupling 147 recessed in the outer face 121 of the saddle 115 and is of like form to the female coupling 143 recessed below the outer surface of the spacer 117 and complementary to the male coupling 144 projecting from the inner surface of the spacer 117 with which it may connect via a snap fit. Like the first embodiment, these couplings 143, 144 and 147 allow multiple spacers to be joined together if required, and also connected to the saddle 115, forming a single assembly. A flange 205 protruding from a corner of the spacer 117 may include an aperture for tethering the spacer.

Figure 17:
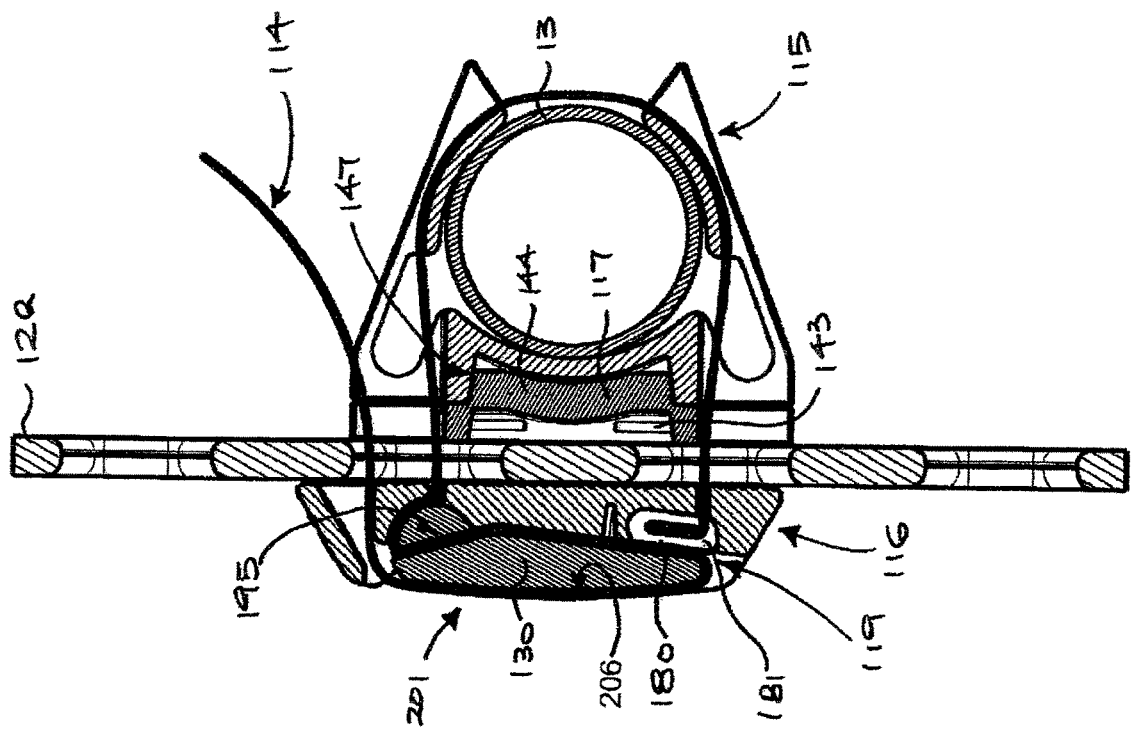
FIG. 17 is a sectional view of the saddle of the fastener assembly of FIG. 16.
Figure 20:
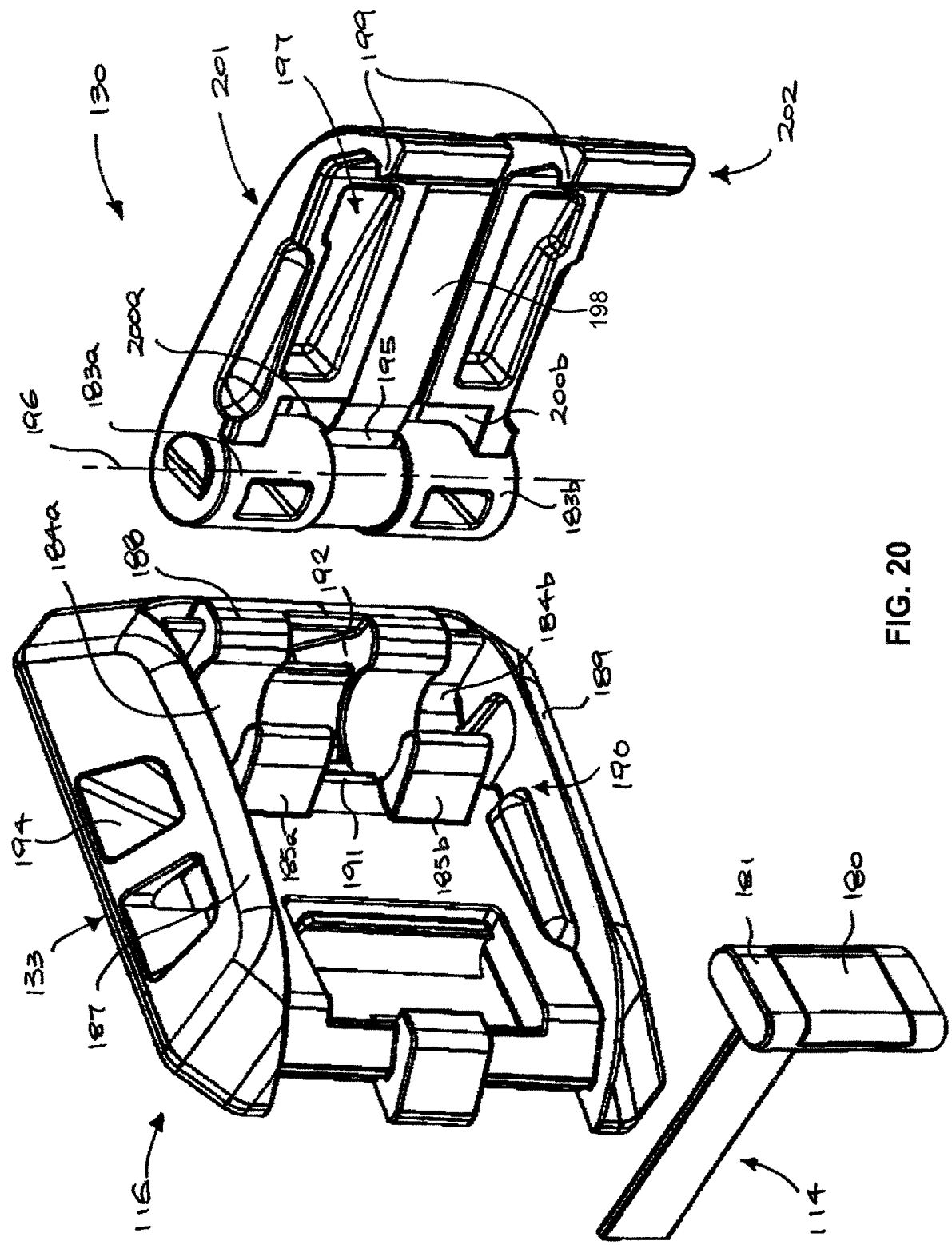
FIG. 20 is an exploded pictorial view of the clamping block, hinged piece and strap of the fastener assembly of FIG. 14.

An elongate flexible tie in the form of strap 114 may comprise a strip of stainless steel completely enveloped in a thin, flexible polymeric coating, for a long service life, even an extremely corrosive environment. As best seen in FIGS. 17 and 20, the head 119 may be formed by doubling over the end of the strap upon itself, and forming an approximately right angle bend in the strap adjacent the doubled-over end 180. The doubled-over end 180 may be received in a reinforcement 181 that is of material that is harder than the material of the clamping block 116, and which is larger than the doubled-over end 180 to distribute the strap tension load into the clamping block 116 over a greater area. The head 119 is received in the clamping block 116 in a through-extending aperture having a stepped form comprising a mouth part proximate the outer face for receiving the head and an adjacent throat part through which head cannot pass. In this manner, the strap 114 and clamping block 116 are connected as an assembly (shown in FIG. 14) with the strap projecting from the inner face 133.

Figure 15:
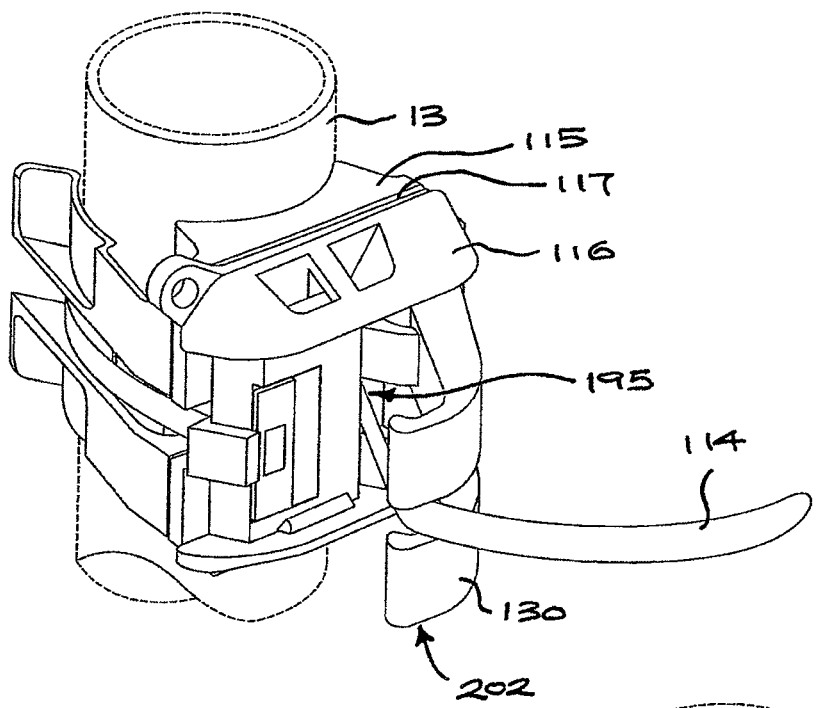
FIGS. 15 and 16 are perspective views of the fastener assembly of FIG. 14 showing the hinged piece open and closed respectively.
Figure 16:
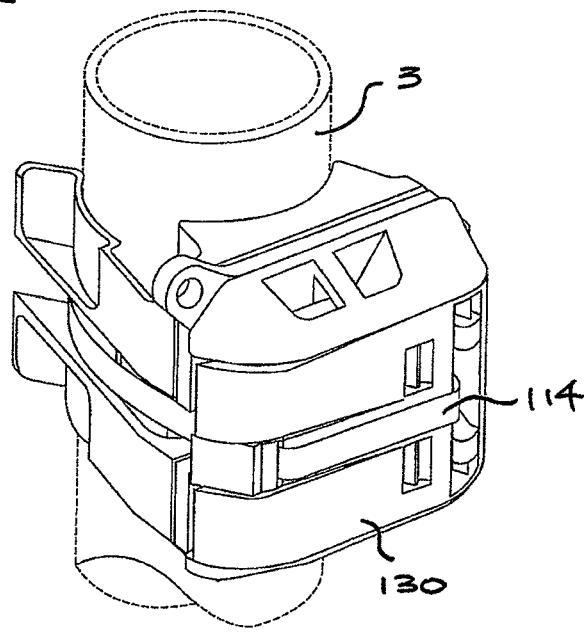

As shown in FIG. 20, the hinged piece 130 is also connected to the strap 114 and clamping block 116 assembly by a hinge for pivoting between a closed position (FIG. 16) in which the hinged piece 130 has an inner surface 197 that substantially overlies the outwardly directed face 190 of the clamping block 116 and an open position (FIG. 15). The hinge may comprise cylindrical external surfaces 183a, 183b formed on the hinged piece 130 and received in respective complementary pivot-receiving recesses 184a, 184b formed in the clamping block 116.

The clamping block 116 may generally comprise raised, generally straight edges 187, 188, 189 intersecting at corners of the block to define a recess 186 with the outwardly directed face 190. Projecting outwardly from face 190 in a cantilevered manner are tabs 185a, 185b that bound the pivot-receiving recesses 184a, 184b and which are able to resiliently deflect such that the hinged piece 130 is connected to the clamping block 116 by a snap fit. A first strap-receiving channel 191 extending through clamping block 116 between opposing inner and outer sides may be disposed between the recesses 184a, 184b to bisect the hinge. A second through-extending strap-receiving channel 192 may be disposed next to the opening 191 on an outer side of the hinge recesses 184a, 184b. For engagement with the panels, the inner face 133 is planar. An aperture 194 may be provided for the attachment of a tether.

In the hinged piece 130 next to each of the cylindrical external surfaces 183a, 183b is a tab-receiving opening 200a, 200b, each extending between the inner side 197 and an outer side 201 and receiving a respective one of the tabs 185a, 185b in the closed position for a low profile closed position. A slot 195 in the hinged piece 130 has a form complementary to the cross-section of the strap 114 providing means for gripping the strap 114. The slot 195 is disposed between the cylindrical external surfaces 183a, 183b and extends transverse to the hinge axis 196 so that, with the tie-receiving channel in the open position, the slot 195 is adjacent to and aligned with the first strap-receiving channel 191 in the block 116. The slot 195 extends out to an inner side 197 of the hinged piece 130, in alignment with a channel 198 in the inner side 197. On the free end 202 of the hinged piece 130 opposite the hinge, latching lugs 199 are formed for engaging a surface of the clamping block 116 for latching the hinged piece 130 closed. In the outer side 201, parallel with the channel 198, a shallow channel 206 (see FIG. 17) may be provided for receiving the strap 114.

Figures 21, 22, 23:
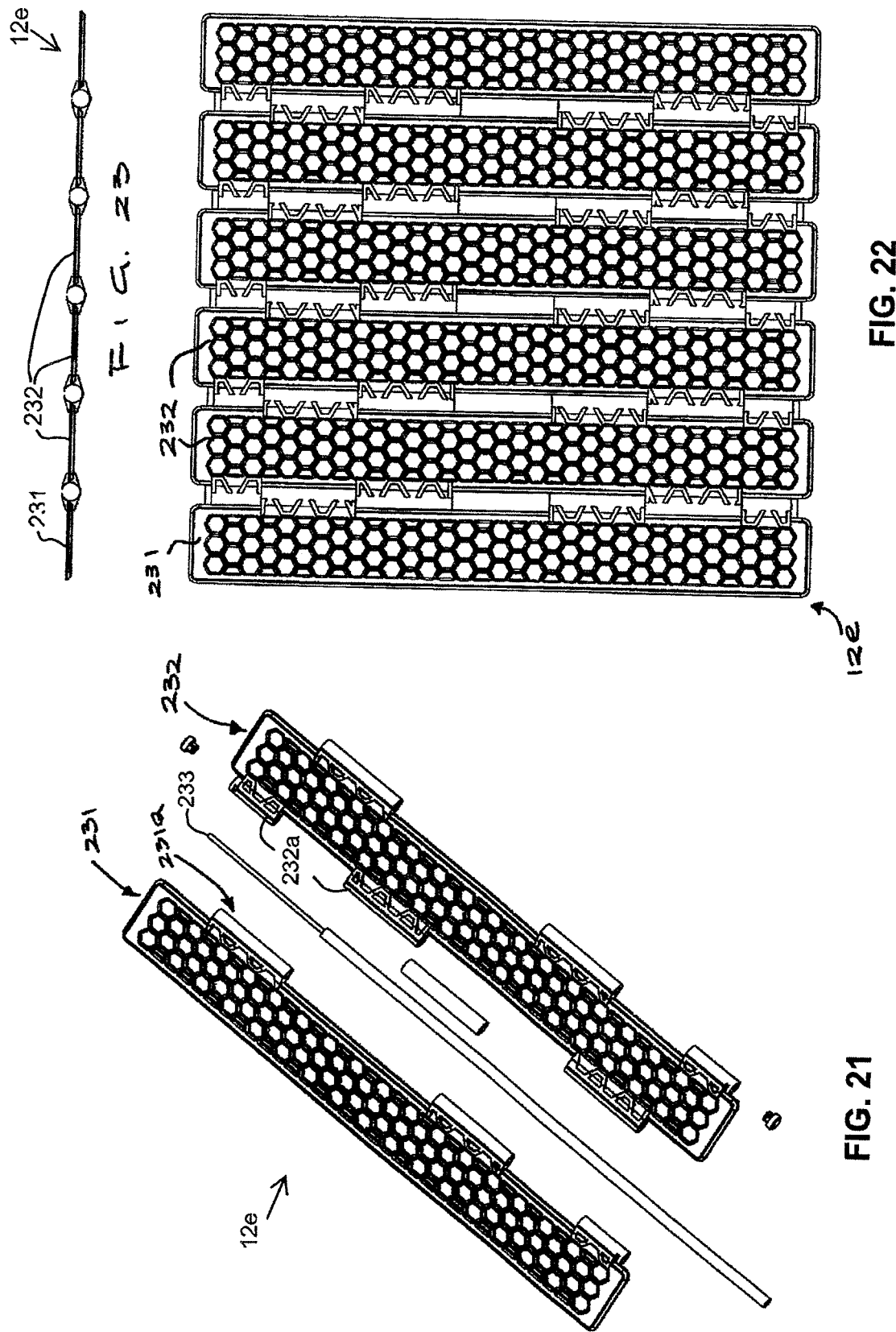
FIGS. 21, 22, and 23 are front, top and side views, respectively, of a second embodiment of a corner panel assembly of the barrier of the invention

FIGS. 21 to 23 illustrate a corner panel assembly 12e of a second embodiment of the invention in which an assembly of a plurality of rectangular panels 231, 232 include continuous hinges along their longitudinal edges, allowing the corner panel assembly 12e to fold along parallel hinge axes to generally follow corners of multiple different radii. The panels may include edge panels 231 at opposite edges of the assembly 12d with a continuous hinge along only one edge, and panels 232 with a continuous hinges along both long edges. Hinge pins 233 extend for the length of the panels 231, 232 and connect interleaved pin-receiving projections 231a and 232a of the panels 231, 232 to form the hinges. The pins 233 may be covered by a tubular sheath 232 (shown partially removed from the pin 233 in FIG. 21) and formed from a compliant material, such as a silicon rubber, and which is fitted in openings in the panels to provide friction, or a shock-absorbing function.

Figure 24:
FIG. 24 is a perspective view of a third embodiment of a corner panel assembly of the barrier of the invention.

FIG. 24 shows a corner panel 12f of a third embodiment of the invention which provides for both a single smooth curvature, and a curvature of larger radius, compared to the first and second embodiments, in which multiple step-wise curves of smaller radius are used. This is achieved simply by providing a flat panel that is sufficiently flexible to be readily manually bent about an upright axis during installation so as to span a corner. The panel 12f is of like form to the panel 12a but the frame 230 is flat i.e the panel 12f lacks the stiffening channel 74 along one edge of the panel 12a.

The barrier system may further comprise one or more brackets 252, 290, 291 that, in use, are mounted near the lower edge of the mesh panels 12, using the clamping block sub-assembly 221 comprising the clamping block 116, hinged piece 130 and strap 114 (or else, and not shown, the assembly comprising the clamping block 16, hinged piece 30 and strap 14) in order to support the lower edge in abutment with an adjacent structural member, such as a toe rail 255.

Referring to FIGS. 25 and 26, the bracket 252 has a face 253 for engaging a complementary surface of the mesh panel 12 and a channel 254 adapted for receiving a toe rail 255 with the form of a flat bar, or the like. The closed end of the channel defines a support surface 394 substantially perpendicular to the face 253, through which the weight supported by the bracket is transferred to the framework that it rests on. The face 253 may be planar, with the channel 254 parallel to the face 253 and to the plane of the mesh panel 12. In use, the bracket 252 may be aligned upright with a tapered mouth 256 of the channel 254 lowermost, and below the face 253, allowing the bracket 252 to be readily lowered over the toe rail 255. The channel 254 may be formed between two tongue portions 257, 258 integral with the bracket 252. Projecting from the face 253 is an array of tabs 259, 260 sized to be received within the hexagonal openings of the mesh panel 12. Recesses or openings 280, 281 in the bracket 252 for receiving the strap 114 may be disposed in opposing sides of the face 253. The bracket 252 may be formed in one-piece, as by moulding from polymeric material. The tabs 260 may each be adapted to span a side of one hexagonal opening and they are spaced apart in the circumferential direction, and define divergent external surfaces 267 that diverge to a radially outermost lip 261. Internally of its divergent external surfaces 267 each tab 260 may have a cylindrical face 268. The resilience of the tabs 260 thus provides a snap-fit fastening between the bracket 252 and mesh panel 12, whereby after being bent inwardly to allow them to pass through the hexagonal opening, the lips 261 are urged outward to retain the tabs 260 in the hexagonal opening.

The bracket 252 can be used alone, or as in a bracket assembly 250 that further comprises one or more spacer blocks 262 and a fastener 263. This bracket assembly 250 may be used in barrier installations where the horizontal distance between the plane of the mesh panel 12 and the toe rail 255 is greater than that which can be spanned by a single bracket 252 alone.

The spacer block 262 has opposing outer and inner sides 264, 265 replicating the cooperating attachment features of the bracket 252 and mesh panel 12 respectively. The inner side 265 is complementary to the face 253 with which it abuts, while it further comprises internal hexagonally arrayed surfaces 266 (of a form corresponding to those on the mesh panel 12) for engaging with the tabs 260 in a snap-fit. An aperture 269 extends centrally between the array of tabs 260 between the outer and inner sides 264, 265. The outer side 264 comprises tabs 359, 360 of like form to the tabs 259, 260 that project from a face 270. Openings 282, 283 in the spacer block 262 for receiving the strap 114 may be disposed in opposing sides of the face 270 for alignment with the openings 280, 281.

At one axial end the fastener 263 may have a tool formation 271 such as a slot for a screwdriver. Coaxial cylindrical portions 272, 273 are connected to an external screw portion 274 that terminates in a resilient bifurcated retaining head 275. As best seen in FIG. 26, the bracket 252 has an internal screw thread 277 and an internal shoulder 276 that engages the head 275 to retain the fastener 263. The fastener 263 is inserted through the aperture 269 into the corresponding opening in the bracket 252, where it is retained by the cooperating retaining head 275 and shoulder 276, optionally with partial engagement between the screw threads 274, 277. In this position, the spacer block 262 and bracket 252 are connected by the snap-fit, and the spacer block 262 may then be connected to the mesh panel 12 by inserting the tabs 259, 260 into the hexagonal openings. Subsequent turning of the fastener 263 displaces the cylindrical portions 272, 273 axially to the positions shown, where they are in registration with the respective cylindrical faces 268 on the bracket 252 and spacer 262, thereby blocking inward deflection of the tabs 260, 260 sufficient to permit disengagement of the connected parts.

The spacer block 262 is paired with the fastener 263 in as much as to provide different spacing between the outer and inner sides 264, 265 requires a fastener of a different axial length. The barrier system may comprise multiple pairs of spacer blocks 262 and respective fasteners 263 to suit different offsets or, if the spacer blocks are stacked a fastener may be provided according to the stacked dimension. In this manner, the bracket assembly 250 may be fixed to the mesh panel 12 in the workshop, or prior to installation, with the appropriately sized spacer block 262 and fastener 263, thereby reducing the assembly required to be completed on site. When the mesh panel 12 and attached bracket assembly 250 are positioned ready for final installation, this is completed using the clamping block sub-assembly 221. With the head 19 of the strap 114 received in the recess in the clamping block 116, the strap 114 is passed in one direction through the mesh panel 12, through the aligned openings 280, 282 on one side, and back upon itself through opening 261 around the bracket 253, before continuing in the opposite direction through the aligned openings 281, 283 on the other side and through the mesh panel 12, and through the tie-receiving aperture 39, before it is tightened and closed to secure the strap 114 in a loop in the manner described below.

Figures 27, 28:
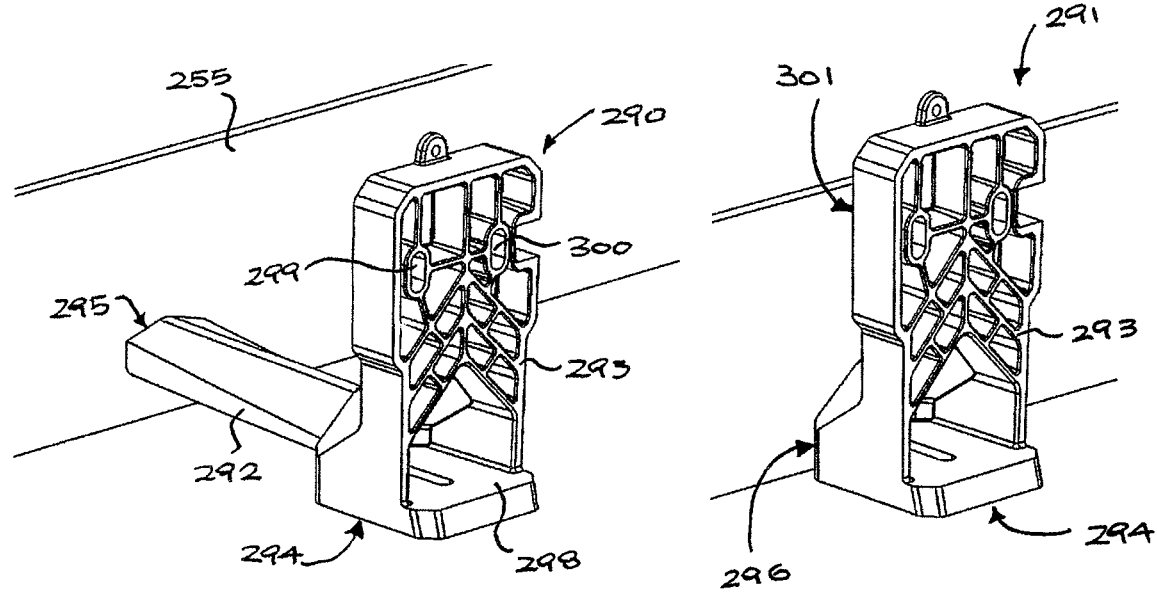
FIGS. 27 and 28 are perspective views of brackets of the barrier system of the invention.
Figure 29:
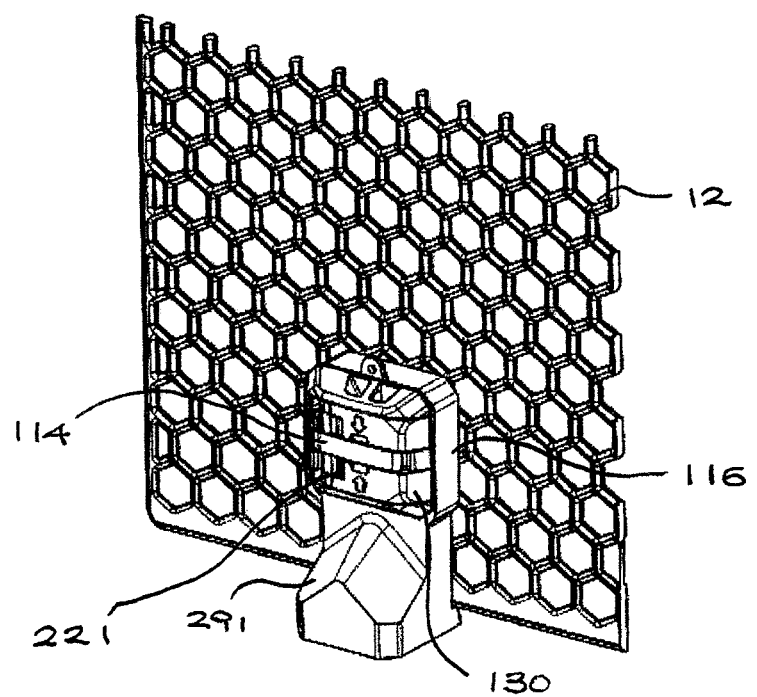
FIG. 29 is a perspective view of the bracket of FIG. 28 in use, supporting a corner of a panel.

Referring to FIGS. 27 to 29, the brackets 290, 291 are of like form except for a projection 292 formed on the bracket 290 and absent from bracket 291. Each has a planar face 292 on a front side for engaging a complementary surface of the mesh panel and a substantially perpendicular support surface 294 through which the weight supported by the bracket is transferred a floor that it rests upon. Opposing the face 292 are faces 295, 296 of the brackets 290, 291 respectively, with the face 295 being formed on the outer end of the projection 292. A ledge 298 may project forward of the face 293. Openings 299, 300 extend from the face 293 between the inner and outer sides of the brackets 290, 291. In use, the brackets 290, 291 are supported upright on a floor as shown, a lower edge of the mesh panel rests on the ledge 298 and against the face 293, while the faces 295, 296 abut the toe rail 255. FIG. 29 shows the bracket 291 mounted in this manner and secured to the panel 12 using the clamping block sub-assembly 221 of the clamping block 116, hinged piece 130 and strap 114, where the clamping block 116 and hinged piece 130 may abut a rear side 301 of the brackets 290, 291, such that only a loop portion (not shown) of the strap 114 protrudes from the outer side of the panel 12.

In use, following a measurement and specification procedure, the barrier system components may be supplied to site accurately configured for the intended application, with the correct number of panels 12a, 12b, 12c, 12d, 12e, 12f of each required type and the corresponding requisite number of the fastening components described above, including: fastener assemblies 111, clamping block sub-assemblies 221 (clamping block 116, hinged piece 130, and strap 114 or clamping block 16, hinged piece 30, and strap 14), as well as of brackets 252, 290, 291 and bracket assemblies 250. Most preferably the fastener assemblies 111 comprise a saddle sub-assembly 220 (comprising a saddle 115 and zero or more spacers 117 attached thereto as described above). The thickness of spacers 117 (if any) on each saddle sub-assembly 220, the thickness of spacer blocks 262 and the length of the strap 114 on the clamping block sub-assembly 221 may be application-specific.

Installation starts by clipping the saddle sub-assemblies 220 to members 13 of the framework that is to support it, as by pressing the neck 65 over the diameter of each member 13, after which they may be aligned so that each presents a planar face 121, 146 outwardly, the faces being approximately parallel and coplanar. Of course a high degree of accuracy is not essential, and angular tolerances of, for instance, ±10° and a tolerance in the spacing of ±15 mm can readily be accommodated. Bracket assemblies 250 may be fixed to the lower edges of the panels 12. A panel 12a is then placed to generally overlie the faces 121, 146 and each clamping block sub-assembly 221 is fixed to each saddle sub-assembly 220, passing the strap 114 through the panel (note that in FIGS. 15 and 16 the panel is omitted for clarity) then about the member 13 so that it is received in the strap-receiving channels 148a, 148b, 127a, 127b before the distal end is inserted through the first strap-receiving channel 191 and through the slot 195 (see FIG. 15). The loop thus formed around the member 13 is reduced in size to clamp the saddle 115 and clamping block 116 together. This is done firstly by manually applying tension to the strap 114, then using the hinged piece 130. Tension is best applied by turning the tensioned strap 114 around the free end 202 of the hinged piece 13, pulling it straight between the slot 195 and the free end 202, before turning the strap 114 about the free end 202 and back along the channel 205 toward the hinge. Friction in the slot 195 and caused by turning the strap 114 around the free end 202 also tends to prevent sliding of the strap relative to the hinged piece 130 so that manually turning the hinged piece 130 to its closed position draws the strap 114 through the first strap-receiving channel 191. As best seen in FIG. 17, the slot 195 provides gripping means adjacent the tie-receiving channel for gripping the strap 114 beyond the friction, due to the local changes in direction of the strap caused by turning the slot 195. With the hinged piece closed, the distal end of the strap 114 may then be passed through the second strap-receiving channel 192 and through the panel, to project from the outer side of the panel and keep the inside clear.

In the closed position (FIGS. 16 and 17), the hinged piece 130 is received within the recess 197 and it lies at or within the boundary of any profile view of the clamping block 116 in a plane perpendicular to the inner side 133, thereby providing the fastener with a low profile that mitigates obstruction. The clamping block 116 tapers in any profile to narrow toward its outer edges for the avoidance of snagging.

The order of assembly can of course be readily varied, as the panels 12 themselves, and the fixing method of the invention, permit a degree of movement sufficient to allow additional fastenings to be readily added at any stage. For instance, after the panels 12 are fixed to the framework using the clamping block sub-assemblies 221 to connect with the saddle sub-assemblies 220 and bracket assemblies 250, brackets 252, 290, 291 may still be connected by snap-fit to the panels 12 before being secured with respective clamping block sub-assemblies 221.

Figure 30:
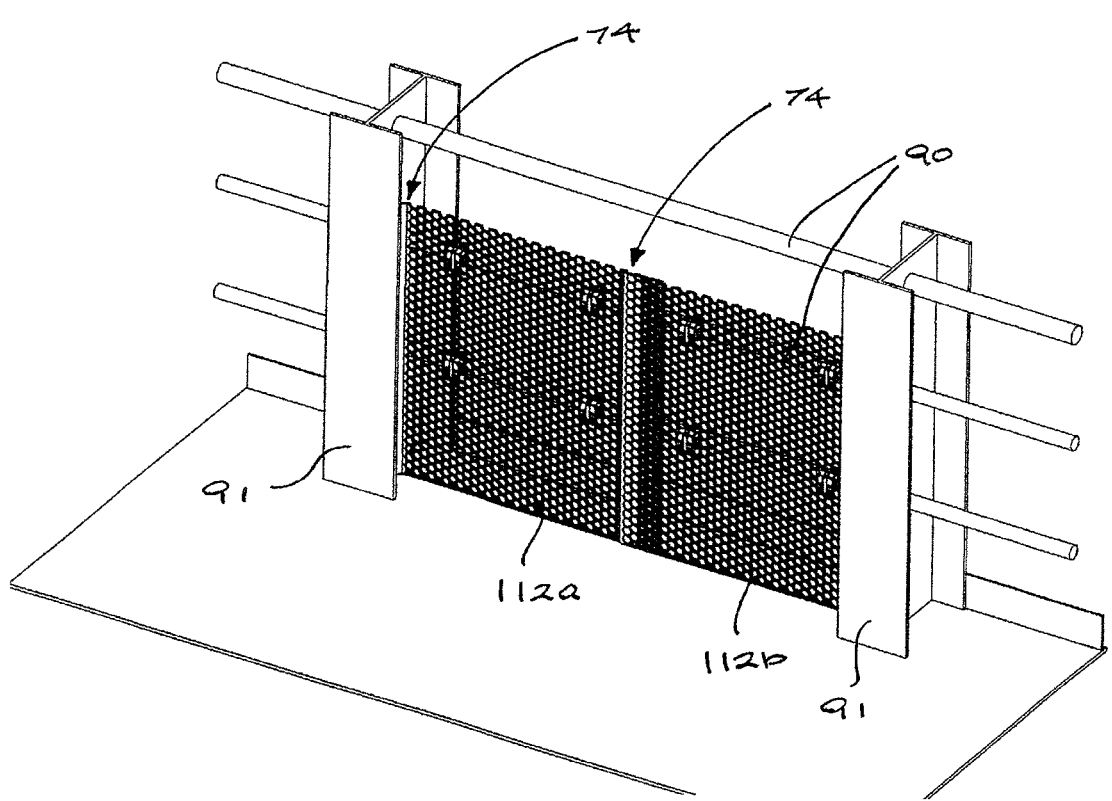
FIG. 30 is a perspective view showing an exemplary installation of the barrier system of the invention on short rail lengths interrupted by posts.

Moreover, while the panels 12a are ordinarily arranged such that their longitudinal axes, and lengthwise channel 74 adjacent the edge, are generally horizontal, the panels 12 can be readily cut during installation and panel pieces can be fixed with a length of the channel 74 upright, depending upon the framework to which the barrier is to be fixed. FIG. 30 shows a situation where cutting and turning the panel pieces in this manner is advantageous. The framework comprises short rail lengths 90 that span between posts 91, the rail lengths 90 together approximately defining an upright plane and a spacing suitable for supporting planar panels. However, as this plane is interrupted by the posts 74, a rectangular panel 12 is cut transversely into two panel pieces 112a, 112b that are installed against the rail lengths 90 and inside the outer edges of the posts 91, with their respective edge channels 74 upright, the pieces overlapping one another span-wise.

Aspects of the present invention have been described by way of example only and it should be appreciated that modifications and additions may be made thereto without departing from the scope thereof.

The invention claimed is:

1. A fastener assembly for mounting a mesh panel to a member of a framework of a safety barrier system, the fastener assembly comprising:
   an elongate flexible tie having a proximal end and an opposing distal end;
   a clamping block having a first major surface for abutting the mesh panel and a second major surface, wherein the first major surface and the second major surface define respective opposing peripheries of the clamping block, such that parts of the first major surface and respective opposing parts of the second major surface are spaced apart in a through-thickness direction and local spacings between said parts define local thicknesses of the clamping block;
   a first tie-receiving channel extending substantially in the through-thickness direction between the first major surface and the second major surface of the clamping block, wherein, with the proximal end received in the first tie-receiving channel, the proximal end is fixable to the clamping block;
   a second tie-receiving channel extending substantially in the through-thickness direction through the clamping block between the first major surface and the second major surface of the clamping block, whereby the distal end can be passed in a loop out from the first tie-receiving channel at the first major surface of the clamping block through the mesh panel, around the member, and in through the second tie-receiving channel at the first major surface; and
   a hinged piece connected by a hinge to the clamping block adjacent the second tie-receiving channel for pivoting between a closed position in which the hinged piece has an inner surface that substantially overlies the second major surface of the clamping block with the tie received therebetween and an open position, wherein a slot in the hinged piece has a form complementary to the cross-section of the tie that provides gripping means adjacent the second tie-receiving channel for gripping the tie and, in the open position, the slot is adjacent to and aligned with the second tie-receiving channel in the clamping block and, wherein, in use, the first major surface of the clamping block abuts the mesh panel and the gripping means grips the tie such that tension in the tie presses the first major surface of the clamping block against the panel.

2. The fastener assembly of claim 1 further comprising a saddle having:
   a tie-receiving channel,
   a concave inner face for abutting the member of the framework, and
   an opposing outer face wherein, in use, the outer face of the saddle and the first major surface of the clamping block abut opposing surfaces of the panel and tension in the tie clamps the panel between the saddle and the clamping block.

3. The fastener assembly of claim 2 including a female coupling recessed in the outer face of the saddle, wherein the fastener assembly further comprises at least one spacer having opposing inner and outer surfaces substantially parallel to one another, and wherein each spacer includes a male coupling projecting from the inner surface of the spacer that is complementary to the female coupling on the saddle and a female coupling recessed in the outer surface of the spacer that is of like form to the female coupling of the saddle wherein, in use, the outer surface of the spacer and the first major surface of the clamping block abut opposing surfaces of the panel and tension in the tie clamps the panel between the spacer and the clamping block.

4. The fastener assembly of claim 3 wherein the at least one spacer further comprises a tie-receiving channel extending between an inner side and an opposing outer side of the spacer for receiving the tie.

5. The fastener assembly of claim 2, wherein the saddle comprises:
   resilient material, and
   opposing arms integral with the saddle are disposed either side of the concave inner face and project inwardly from the inner side for clipping the saddle to the framework.

6. The fastener assembly of claim 5, wherein:
   the saddle comprises a base part on which the inner face and outer face are located and from opposite edges of which the arms extend, and
   a concavity in the base at an inner end of each arm is arcuate and bounds a hinge portion connecting each arm to the base.

7. The fastener assembly of claim 5, wherein:
   each arm comprises an inner concave face that intersects with a tapered face at a neck, and
   the tapered faces diverge in a longitudinal direction of each arm from the neck toward a respective end of the arm.

8. The fastener assembly of claim 7, wherein each arm further comprises a pair of substantially parallel ribs elongated in the longitudinal direction of the arm, and disposed on opposite sides of a channel for receiving the tie.

9. The fastener assembly of claim 1, wherein the tie comprises a head located on the proximal end and received in the first tie-receiving channel, wherein the first tie-receiving channel has a stepped form comprising:
   a mouth part proximate the second major surface for receiving the head, and
   an adjacent throat part through which the head cannot pass.

10. The fastener assembly of claim 9, wherein
   the head is formed by doubling over the tie upon itself,
   the head is received in the stepped recess within a reinforcement of material that is harder than the material of the clamping block, and
   the reinforcement is received in the stepped aperture in the clamping block.

11. The fastener assembly of claim 1, wherein the tie comprises a strap.

12. The fastener assembly of claim 1, wherein:
the hinge comprises a cylindrical external surface received in a complementary pivot-receiving recess in one of the hinged piece and the clamping block, and
the one of the hinged piece and the clamping block is a resilient material, such that the hinged piece is connected to the clamping block by in a snap fit.

13. The fastener assembly of claim 12, wherein:
the cylindrical external surface is on the hinged piece and the pivot-receiving recess is on the clamping block,
the pivot-receiving recess includes a tab that projects generally outwardly from the outer side of the clamping block, and
a through-extending tab-receiving opening in the hinged piece receives the tab in the closed position.

14. The fastener assembly of claim 12, wherein the tie is aligned such that a major dimension of the cross-section of the strap is aligned parallel to an axis of the hinge.

15. The fastener assembly of claim 12 including a channel in the outer face of the hinged member for receiving the tie.

16. The fastener assembly of claim 1, including, on an end of the hinged piece, opposite the hinge, latching lugs for engaging a complementary recess on the clamping block for latching the hinged piece in the closed position.

17. The fastener assembly of claim 16, wherein the clamping block comprises a recess, and in the closed position the hinged piece is received within the recess.

18. The fastener assembly of claim 16, wherein the first major surface is planar and, with the hinged piece attached to the clamping block in the closed position, the hinged piece lies at or within any profile view of the clamping block in a plane perpendicular to the first major surface.

19. The fastener assembly of claim 18, wherein, in the any profile, the clamping block tapers to become narrower toward its outer edges.

20. A barrier system comprising:
a fastener assembly as claimed in claim 1; and
a mesh panel made of a polymeric material and having a honeycomb-shaped mesh, wherein the tie is sized to pass in a loop through openings in the honeycomb-shaped mesh and around the member of the framework and wherein, in use, the first major surface of the clamping block abuts the mesh panel and the gripping means grips the tie such that tension in the tie presses the first major surface of the clamping block against the mesh panel.

21. The barrier system of claim 20, wherein webs of the honeycomb-shaped mesh have an elliptical cross-section, with a long axis of the elliptical cross-section aligned transversely to the mesh panel.

22. The barrier system of claim 21, wherein:
the mesh panel further comprises a perimeter frame that surrounds the honeycomb-shaped mesh and is integral with the honeycomb-shaped panel, and
the perimeter frame is continuous and imperforate.

23. The barrier system of claim 22, wherein the mesh panel has a rectangular form with an integral stiffener extending continuously along at least one long edge of the mesh panel.

24. The barrier system of claim 23, wherein the integral stiffener is of constant form throughout a length of the integral stiffener and defines a channel.

25. The barrier system of claim 24, wherein:
the integral stiffener comprises a plurality of integral stiffeners extending continuously along two opposite edges of the mesh panel,
the two opposite edges include notches disposed in a regular rectangular array, and
the notches are aligned so as to define parallel hinge axes between notches on opposing ones of the opposite edges, such that the mesh panel may bend along the parallel hinge axes.

26. The barrier system of claim 20, comprising a corner panel assembly of a plurality of first rectangular panels, wherein:
each first rectangular panel includes continuous hinges along both long edges, and
each of the first rectangular panels connected is to an adjacent one of the first rectangular panels by one of the continuous hinges.

27. The barrier system of claim 26 further comprising two second rectangular panels, wherein:
each second rectangular panel includes a continuous hinge along one edge, and
opposing outermost ones of the first rectangular panels are respectively connected to one of the two second rectangular panels by a respective continuous hinge.

28. The barrier system of claim 26 including a respective hinge pin joining each adjacent pair of first rectangular panels, wherein each hinge pin is sheathed in a compliant material.

29. The barrier system of claim 20, further comprising a bracket for supporting a lower panel edge in abutment with an adjacent structural member, the bracket having:
a face for engaging a complementary surface of the mesh panel,
recesses in the bracket for receiving a strap disposed in opposing sides of the face, and
a support surface substantially perpendicular to the face, through which weight supported by the bracket is transferred.

30. The barrier system of claim 20, further comprising a bracket for supporting a lower panel edge in abutment with an adjacent structural member, the bracket having:
a face for engaging a complementary surface of the mesh panel,
recesses in the bracket for receiving a strap disposed in opposing sides of the face, and
a support surface substantially perpendicular to the face, through which weight supported by the bracket is transferred,
wherein the bracket comprises:
projecting flexible tabs providing a snap fit engagement with openings in the mesh panel,
a spacer block with opposing outer and inner sides replicating cooperating attachment features of the bracket and mesh panel, respectively, for permitting a snap fit engagement between the bracket and the inner side of the spacer block and between the outer side of the spacer block and the openings in the mesh panel, and
a screw fastener for blocking inward deflection of the projecting flexible tabs sufficient to permit disengagement of the bracket, the spacer block, and mesh panel, when connected together.

* * * * *